United States Patent
Butler et al.

(10) Patent No.: US 10,107,967 B1
(45) Date of Patent: Oct. 23, 2018

(54) FIBER ARRAY ASSEMBLIES FOR MULTIFIBER CONNECTORIZED RIBBON CABLES AND METHODS OF FORMING SAME

(71) Applicant: CORNING RESEARCH & DEVELOPMENT CORPORATION, Hickory, NC (US)

(72) Inventors: Douglas Llewellyn Butler, Painted Post, NY (US); Jeffrey Scott Clark, Lindley, NY (US); Robin May Force, Corning, NY (US); James Scott Sutherland, Corning, NY (US); Clifford G. Sutton, Horseheads, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 15/797,355

(22) Filed: Oct. 30, 2017

(51) Int. Cl.
*G02B 6/36* (2006.01)
*G02B 6/40* (2006.01)

(52) U.S. Cl.
CPC ......... *G02B 6/3612* (2013.01); *G02B 6/3676* (2013.01); *G02B 6/403* (2013.01)

(58) Field of Classification Search
CPC ..... G02B 6/3612; G02B 6/3676; G02B 6/403
See application file for complete search history.

(56) References Cited

U.S. PATENT DOCUMENTS

| | | | |
|---|---|---|---|
| 4,252,407 A * | 2/1981 | Bubanko | G02B 6/383 385/59 |
| 5,321,785 A | 6/1994 | Iida et al. | |
| 5,377,286 A | 12/1994 | Iida et al. | |
| 6,108,467 A * | 8/2000 | Naraoka | G02B 6/3508 385/16 |
| 6,321,019 B1 | 11/2001 | Shibuya et al. | |
| 7,333,699 B2 * | 2/2008 | Jacobsen | H01R 13/22 385/115 |
| 7,603,153 B2 * | 10/2009 | Jacobsen | A61B 5/04001 29/825 |
| 2016/0018593 A1 * | 1/2016 | Tasker | G02B 6/3885 385/37 |

FOREIGN PATENT DOCUMENTS

| | | |
|---|---|---|
| EP | 176623 A1 | 4/1986 |
| JP | 2003043305 A | 2/2003 |
| JP | 2005345951 A | 12/2005 |

* cited by examiner

*Primary Examiner* — Ryan Lepisto
(74) *Attorney, Agent, or Firm* — Robert L. Branham

(57) ABSTRACT

The fiber array assemblies include an interdigitated signal-fiber array supported on a support substrate and formed by front-end sections of first signal fibers interdigitated with either front-end sections of second signal fibers or spacer fibers. The assemblies also include a fiber pusher device that may comprise glass and first and second ends. The fiber pusher device is disposed so that its first and second ends contact and push against first and second edges of the interdigitated signal-fiber array to remove gaps between adjacent signal fibers. A cover sheet is disposed atop the interdigitated signal-fiber array and covers at least a portion of the fiber pusher device to define a ferrule. A securing material is disposed within a ferrule interior to secure the cover sheet, the interdigitated signal-fiber array and the fiber pusher devices. The fiber array assemblies can be connectorized by adding an interconnect device or the like.

33 Claims, 24 Drawing Sheets

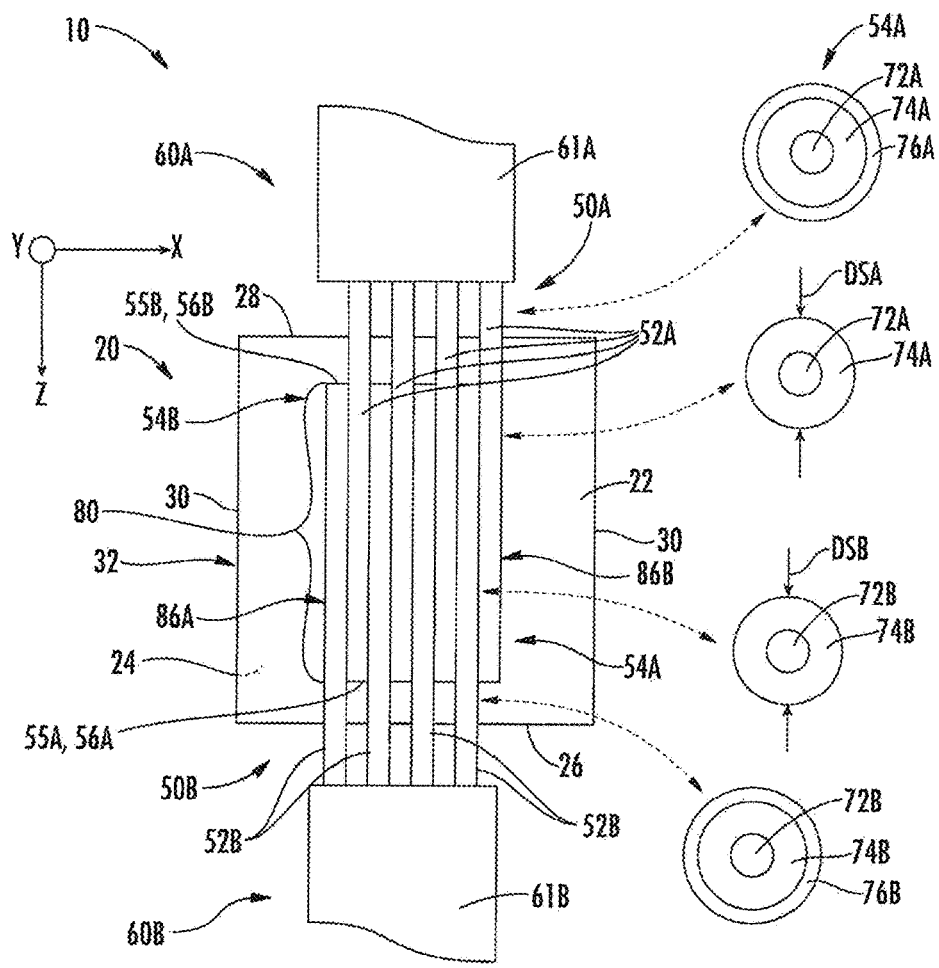
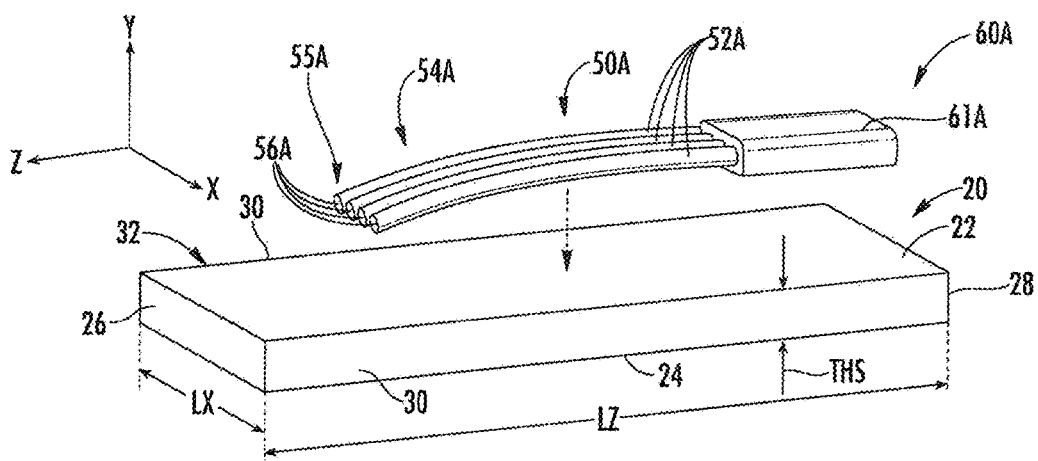
FIG. 1A
FIG. 1B

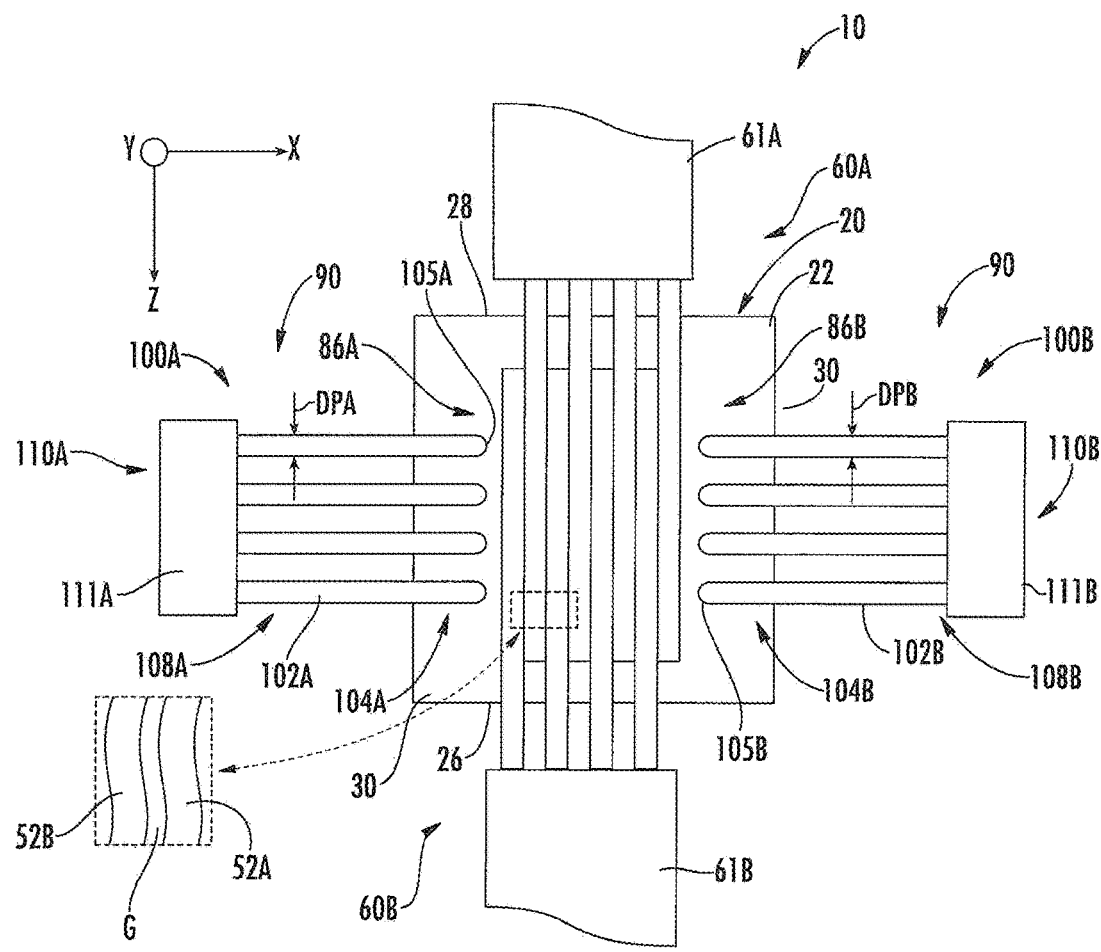
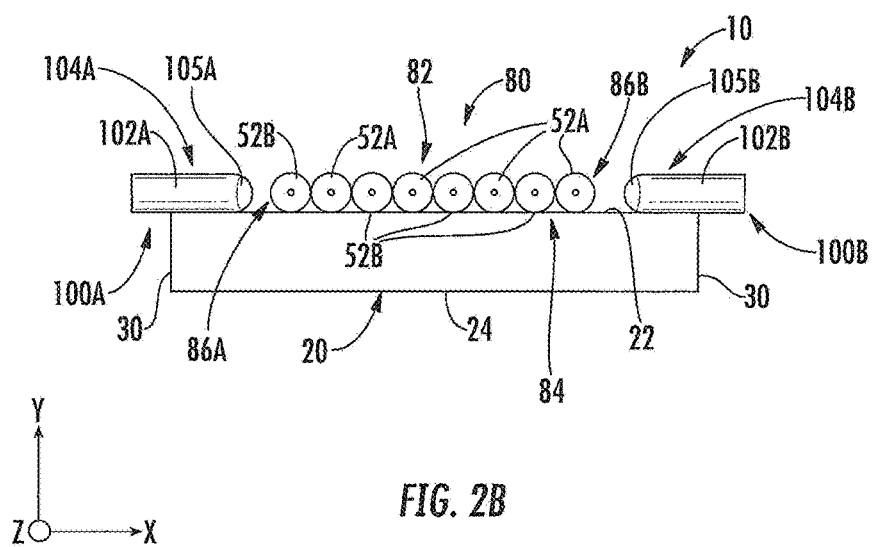
FIG. 2A
FIG. 2B

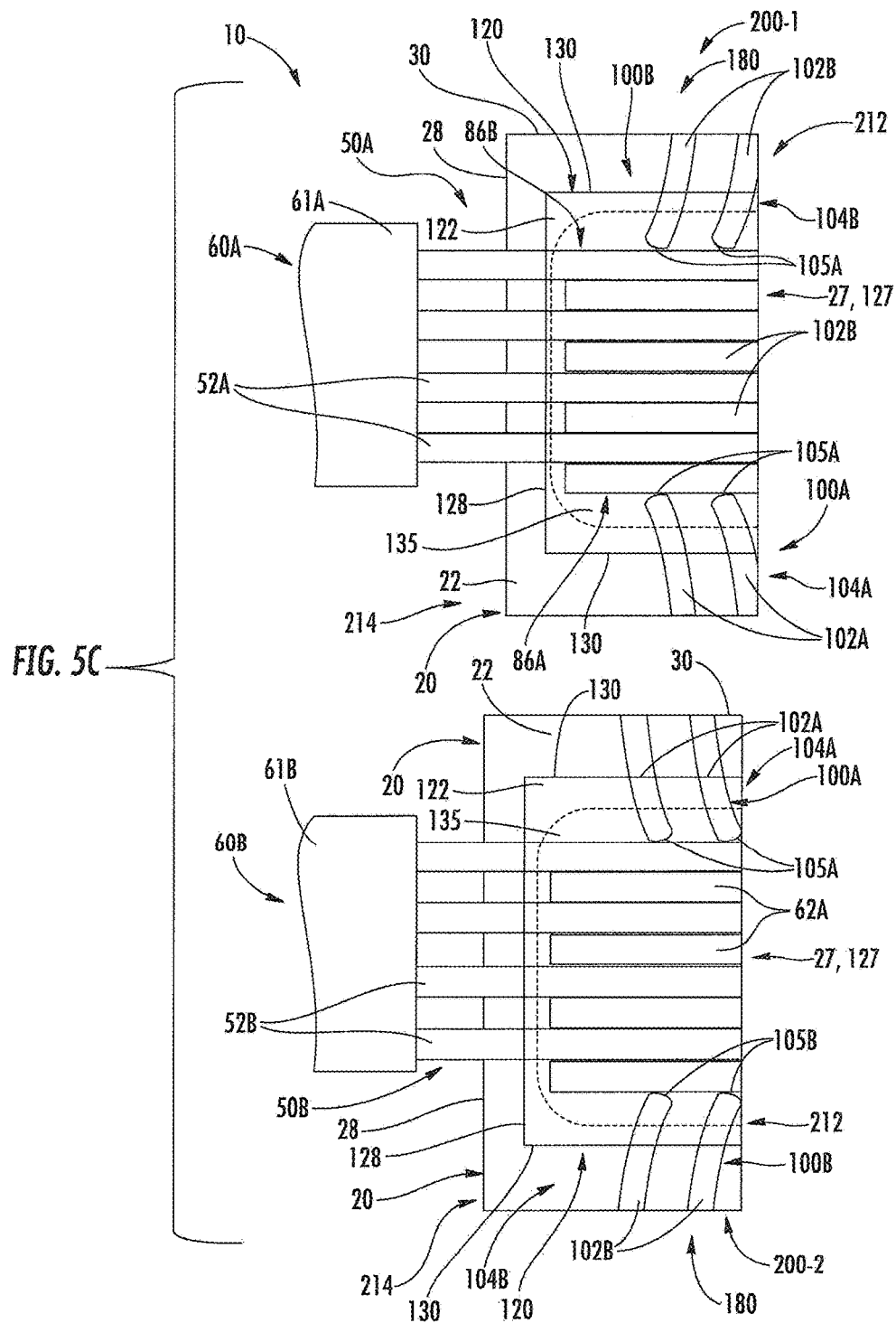

FIBER ARRAY ASSEMBLIES FOR MULTIFIBER CONNECTORIZED RIBBON CABLES AND METHODS OF FORMING SAME

FIELD

The present disclosure relates to fiber connectors used to optically connect optical fibers with other optical fibers or to optical waveguides, and in particular relates to fiber array assemblies for multifiber connectorized ribbon cables, and methods of forming the fiber array assemblies and the multifiber connectorized ribbon cables.

BACKGROUND

Fiber connectors are optical interconnection devices that are used to optically connect a first optical fiber to a second optical fiber, or a first set (array) of optical fibers to a second set (array) of optical fibers. Such fiber connectors are sometimes called fiber-to-fiber connectors. The optical fibers are typically carried by optical fiber cables ("cables"). Cables that carry multiple optical fibers are called multifiber cables. Cables where the optical fibers are carried in rows and which are relatively flat are called fiber ribbon cables or just "ribbon cables."

Fiber connectors can also be used to optically connect an array of optical fibers carried by a multifiber cable to an array of optical waveguides of a planar light circuit (PLC) or an integrated photonic device such as a photonic integrated circuit (PIC). Such fiber connectors are sometimes called fiber-to-chip connectors.

Because optical fibers have relatively small core diameters, e.g., on the order of 10 microns for single mode fibers, fiber-to-fiber connectors and fiber-to-chip connectors need to establish alignment with their counterpart, connector or waveguide connector to submicron accuracy. Fiber connectors configured to connect multiple optical fibers such as carried by a multifiber connector are referred to as multifiber connectors.

The conventional approach to achieving alignment of an array of optical fibers in a multifiber connector is to use a V-groove substrate machined from flat glass. Unfortunately, fabricating V-groove substrates is time consuming and requires the use of expensive machine tools. As it is anticipated that multifiber connectors will find increasing use for a variety of applications that would benefit from leveraging the data-carrying capacity of multifiber cables, there is a need for low-cost manufacturing solutions for forming multifiber connectors that can still provide the required alignment precision when making optical interconnections between arrays of optical fibers or between an array of optical fibers and an array of waveguides of a PLC or PIC.

SUMMARY

An embodiment of the disclosure is a fiber array assembly that includes: a support substrate having a first surface; an interdigitated signal fiber array supported on the first surface of the support substrate and comprising front-end sections of first signal fibers and interdigitated with either front-end sections of second signal fibers or spacer fibers, wherein the interdigitated signal fiber array has a first side and opposite first and second edges; a fiber pusher device comprising glass and that comprises first and second ends disposed on the first surface of the support substrate so that first and second ends of the fiber pusher device contact and push against the first and second edges of the interdigitated signal-fiber array; a cover sheet disposed on the first side of the interdigitated signal-fiber array and covering at least a portion of the fiber pusher device for defining a ferrule having an interior that includes the front-end sections of the first signal fibers; and a securing material disposed in the interior of the ferrule for securing together the cover sheet, the interdigitated signal-fiber array and the fiber pusher device. In an example, the support substrate and the cover sheet are made of glass.

Another embodiment of the disclosure is a fiber array assembly product formed by the following process: interdigitating first signal fibers and second signal fibers to define an interdigitated signal-fiber array supported on a surface of a support substrate, wherein the interdigitated signal-fiber array has opposite first and second sides and opposite first and second opposite edges; pushing against the first and second edges of the interdigitated signal-fiber array using a fiber pusher device; disposing a cover sheet on the first side of the interdigitated signal-fiber array and covering at least end portions of the first and second pusher fibers; securing together the interdigitated signal-fiber array, the support substrate, the cover sheet and portions of the fiber pusher device to define a ferrule disposed about the first and second sides and the first and second edges of the interdigitated signal-fiber array; and cutting the ferrule through the interdigitated signal-fiber array transverse to the first and second signal fibers to form the at least one fiber array assembly product.

Another embodiment of the disclosure is a method of forming at least one fiber array assembly. The method includes: interdigitating first signal fibers and second signal fibers to define an interdigitated signal-fiber array supported on a surface of a support substrate, wherein the interdigitated signal-fiber array has opposite first and second sides and opposite first and second opposite edges; pushing against the first and second edges of the interdigitated signal-fiber array using a fiber pusher device; disposing a cover sheet on the first side of the interdigitated signal-fiber array and covering at least end portions of the first and second pusher fibers; securing together the interdigitated signal-fiber array, the support substrate, the cover sheet and portions of the fiber pusher device to define a ferrule disposed about the first and second sides and the first and second edges of the interdigitated signal-fiber array; and cutting the ferrule through the interdigitated signal-fiber array transverse to the first and second signal fibers to form the at least one fiber array assembly product.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIG. 1A is a top-down view of an example fiber ribbon assembly at an initial stage of formation and showing an interdigitated signal-fiber array of signal fibers from respective multifiber cables and supported by a support substrate;

FIG. 1B is a side elevated view of an example multifiber cable showing how the signal fibers have a curvature due to the manufacturing conditions of the cable and showing how the signal fibers are preferably arranged when adding the signal fibers to the support substrate;

FIG. 2A is similar to FIG. 1A and shows the fiber ribbon assembly of FIG. 1A as further including fiber-pusher arrays of pusher fibers disposed adjacent opposite edges of the interdigitated signal-fiber array;

FIG. 2B is a x-y cross-sectional view taken through the interdigitated signal-fiber array and through the center of two of the pusher fibers of FIG. 2A;

FIG. 3A is an x-y cross-sectional view similar to FIG. 2B and showing the addition of a cover sheet to the fiber ribbon assembly of FIG. 2A;

FIG. 3B is similar to FIG. 3A and shows the cover sheet in place on the interdigitated signal-fiber array and also showing the application of a squeezing force in the +y and −y directions;

FIGS. 5B and 5C show the fiber ribbon assembly of FIG. 5A having been cut along the cutting line to form the two fiber array assemblies;

FIG. 8A is a top-down view of an example fiber ribbon assembly cut to form two fiber array assemblies, wherein the support substrate includes assembly features;

DETAILED DESCRIPTION

Figure 1C:
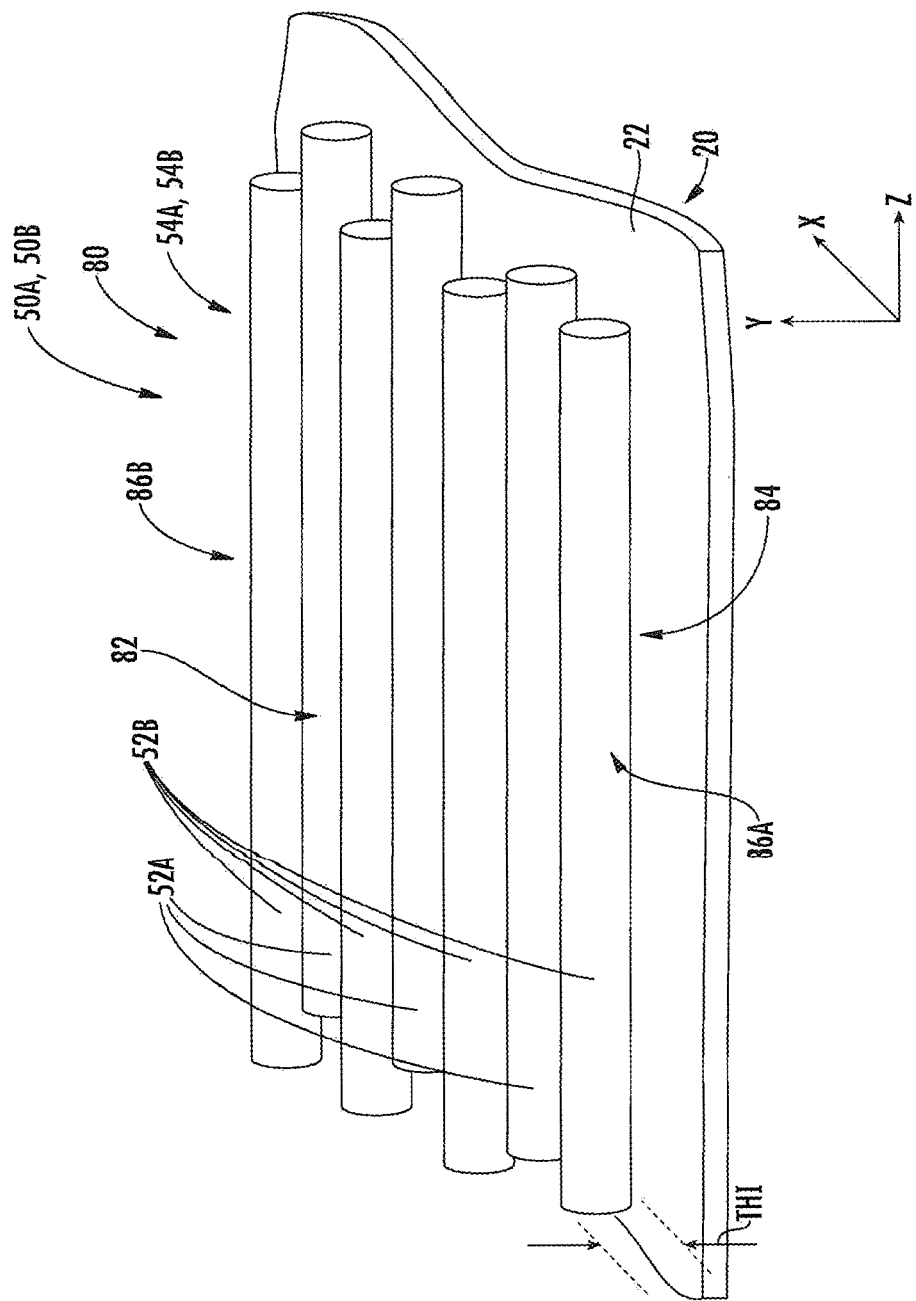
FIG. 1C is a close-up elevated view of the interdigitated signal-fiber array.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this detailed description.

Cartesian coordinates are shown in some of the Figures for the sake of reference and are not intended to be limiting as to direction or orientation. Likewise, use of relative terms such as "top," and "bottom" and "side" and "edge" and the like are used herein for ease of description and explanation and are not intended to be limiting as to a direction or orientation.

The term "interdigitated" as used herein with respect to first and second signal fibers means that the first and second signal fibers (say, A and B) are arranged in an alternating pattern A-B-A-B-A-B . . . .

Fiber Ribbon Assembly

FIG. 1A is a top-down view of an example fiber ribbon assembly 10 at an initial stage of formation. The fiber ribbon assembly 10 includes a planar support substrate 20 having a top surface 22, a bottom surface 24, a front end 26, a back end 28 and opposite edges 30. The support substrate has dimensions LX, LZ and THS (see FIG. 1B). The support substrate 20 can be in the form of a glass sheet. The front end 26, the back end 28 and the opposite edges 30 define a perimeter 32 of the support substrate 20.

The support substrate 20 is preferably small and thin (e.g., LX=3 mm, LZ=10 mm and THS=1 mm) to enable fabrication of compact fiber array assemblies and interconnect devices such as connectors. Glass is a preferred material for the support substrate 20 because it has a coefficient of thermal expansion (CTE) that is a close match to that of silicon materials commonly used in active photonic components. While other materials, such as silicon, can also be used, glass is particularly attractive because it is transparent to visible light, simplifying alignment of optical fibers sandwiched between sheets of glass during assembly. The transparency of glass is also advantageous because it transmits UV light, enabling UV curing of UV-curable adhesives.

In an example, the support substrates 20 can be fabricated using a process that ensures a high degree of flatness with minimal surface roughness, e.g., Ra<0.1 micron, where Ra is the arithmetic average of the absolute values of the profile height deviations from a mean line, recorded within the evaluation length. Said differently, Ra is the average of a set of individual measurements of the peaks and valleys in a surface taken over a given length. One suitable method for fabricating support substrate 20 is a fusion draw process used for LCD glass fabrication. Another suitable fabrication method uses traditional glass grinding and polishing processes.

In an example, the thicknesses THS of the support substrate 20 can be the range from 0.7 mm to 1.0 mm, but this thickness THS can be smaller or greater depending on the particular application requirements. For example, it may advantageous for the support substrate 20 to have at a thickness THS that provides for sufficiently rigid support for the fiber arrays introduced and discussed below. In some cases, glass support substrates 20 with a thickness THS<0.4 mm may tend to deflect during assembly and use, resulting in unacceptable out-of-plane fiber alignment, known as "potato-chipping". Conversely, since sheet stiffness increases with the cube of the sheet thickness, relatively broad fiber arrays can be accommodated through only modest increases in the thickness THS.

The support substrate 20 can be cut to size from a larger sheet using a computer controlled dicing saw with a diamond blade or by laser cutting. A single sawing or cutting operation carried out on a wafer or glass sheet sample can yield hundreds of support substrates 20. After sawing, the support substrates 20 can be lightly sanded around their edges to round off sharp corners that might otherwise damage bare optical fibers during the sandwich assembly process. The support substrates 20 can then be cleaned manually by wiping the surfaces with an ethanol-soaked wipe. The support substrates 20 can also be cleaned in an oxygen plasma furnace to completely remove all organic materials from the surfaces and to prepare the top surface for subsequent bonding using organic adhesives.

With continuing reference to FIG. 1, the fiber ribbon assembly 10 also includes a first signal-fiber array 50A having first signal optical fibers ("first signal fibers") 52A and a second signal-fiber array 50B having second signal optical fibers ("second signal fibers") 52B. The first and second signal fibers 52A and 52B have respective front-end sections 54A and 54B that include respective front ends 55A and 55B that have respective end faces 56A and 56B. The first and second signal-fiber arrays 50A and 50B are referred to as "signal-fiber arrays" because the corresponding first and second signal fibers 52A and 52B can carry optical signals. The first and second signal fibers 52A and 52B have respective diameters DSA and DSB, where in the example shown in FIG. 1A, DSA=DSB.

Each first signal fiber 52A comprises a core 72A, a cladding 74A surrounding the core, and a protective coating 76A surrounding the cladding. Likewise, each second signal fiber 52B comprises a core 72B, a cladding 74B surrounding the core, and a protective coating 76B surrounding the cladding. In an example, the protective coatings 76A and 76B are stripped way to define "bare glass" first and second signal-fiber sections. Thus, in an example, the front-end sections 54A and 54B of the first and second signal fibers 52A and 52B are formed as bare-glass front-end sections. In an example, the first signal fibers 52A are the exact same type of optical fibers as the second signal fibers 52B. In another example, the first and signal fibers 52A and 52B are different types of optical fibers that have the same fiber diameters DSA and DSB.

In an example, the first and second signal-fiber arrays 50A and 50B are respectively supported by first and second multifiber cables 60A and 60B that have respective cable jackets 61A and 61B. In the example of FIG. 1A, front-end portions of the cable jackets 61A and 61B are stripped away to access the first and second signal fibers 52A and 52B. In addition, the protective coatings 76A and 76B are respectively removed (stripped) from the front-end sections 54A and 54B of the first and second signal fibers 52A and 52B to form the bare-glass front-end sections 54A and 54B. The stripping processes for removing the cable jackets 61A and 61B can be carried out using mechanical strippers, which heat and soften the cable jacket prior to removal using a pair of serrated blades. The protective coatings 76A and 76B can be removed using a similar mechanical process or a laser-based stripping processes. In an example, the first and second multifiber cables 60A and 60B comprise ribbon cables, as shown in FIG. 1A.

After the cable jackets 61A and 61B and the protective coatings 76A and 76B are stripped away, the exposed portions of the first and second signal-fiber arrays 50A and 50B can be cleaned. In an example, this is accomplished by sandwiching the first signal fibers 52A or the second signal fibers 52B between a lint-free wipe that has been soaked in ethanol, and then drawing the wipe toward the front ends 55A or 55B of the corresponding signal fibers. The first and second signal-fiber arrays 50A and 50B can also be cleaned using an oxygen plasma.

When the front-end portions of the protective jackets 61A and 61B are removed from the first and second multifiber cables 60A and 60B, the first and second signal fibers 52A and 52B tend to curl in one direction, as illustrated in FIG. 1B for the first multifiber cable 60A and the signal-fiber array 50A. This curl arises from fiber ribbon manufacture from individual spools of optical fiber, which all curl in the same direction based on their manufacturing conditions.

Thus, when forming the fiber ribbon assembly 10, the first and second signal-fiber arrays 50A and 50B are arranged so that the curl of the first and second signal fibers 52A and 52B is directed downward, i.e., towards the top surface 22 of the support substrate 20, as shown in FIG. 1B. This ensures that when the first and second signal-fiber arrays 50A and 50B are brought into proximity to the support substrate 20, the front ends 55A and 55B of the first and second signal fibers 52A and 52B make contact with the top surface 22 of the support substrate 20. If the front ends 55A and 55B ends of the first and second signal fibers 52A and 52B are not in contact with the top surface 22 of the support substrate 20, the first and second signal-fiber arrays 50A and 50B can later become crossed and misaligned during the assembly process, which is described below.

With reference again to FIG. 1A and also to the elevated close-up view of FIG. 1C, the bare-glass front-end sections 54A and 54B of the first and second signal fibers 52A and 52B are supported on the top surface 22 of the support substrate 20 and are interdigitated to define an interdigitated signal-fiber array 80. The interdigitated signal-fiber array 80 has a bottom side 84 that resides closest to the top surface 22 of the support substrate 20, a top side 82 that resides opposite the bottom side 84, opposite edges 86A and 86B, and a thickness THI as measured between the top and bottom sides. Thus, the top and bottom sides 82 and 84 are separated in the y-direction while the opposite edges 86A and 86B are separated in the x-direction. The formation of the interdigitated signal-fiber array 80 and subsequent fabrication steps can be carried out with the aid of manual or computer controlled micropositioning stages and fiber array fixturing hardware known in the art.

FIG. 2A is similar to FIG. 1A and shows the fiber ribbon assembly 10 along with a fiber pusher device 90 that pushes on the respective edges 86A and 86B of the interdigitated fiber array 80 to squeeze the first and second signal fibers 52A and 52B together to substantially reduce or eliminate gaps G that can exist between adjacent signal fibers.

In a first example, the fiber pusher device 90 comprises first and second fiber-pusher arrays 100A and 100B. The first and second fiber pusher arrays 100A and 100B respectively include first and second pusher optical fibers ("pusher fibers") 102A and 102B that in an example extend from respective first and second pusher ribbon cables 110A and 110B, which have respective cable jackets 111A and 111B. FIG. 2B is a x-y cross-sectional view taken through the center of the interdigitated signal-fiber array 80 and through respective first and second pusher fibers 102A and 102B. The first and second pusher fibers 102A and 102B have respective front-end portions 104A and 104B with respective front ends 105A and 105B and diameters DPA and DPB, where in the example shown DPA=DPB. Also in an example, DPA=DPB=DSA=DSB. The first and second pusher fibers 102A and 102B also have respective back-end portions 108A and 108B that extend all the way up to the corresponding front-end portions 104A and 104B.

In an example, the first and second pusher fibers 102A and 102B of the first and second fiber-pusher arrays 100A and 100B have diameters DPA=DPB=125 microns, or a diameter slightly less than 125 microns, such as in the range from 120 microns to 123 microns. The first and second fiber-pusher arrays 100A and 100B are respectively disposed with their bare glass front-end portions 104A and 104B supported on the top surface 22 of the support substrate 20 and with their respective front ends 105A and 105B in close proximity to or just contacting edges 86A and 86B of the interdigitated signal-fiber array 80. At this stage of the fabrication, the interdigitated signal-fiber array 80 can include gaps G between adjacent first and second signal fibers 52A and 52B, as shown in the close-up inset in FIG. 2A.

In an example, the bare glass front-end portions 104A and 104B are 2 mm to 5 mm long. In examples, the front ends 105A and 105B can be rounded or can be flat. As with the first and second signal-fiber arrays 50A and 50B, the first and second fiber-pusher arrays 100A and 100B are disposed on the top surface 22 of the support substrate 20 with the direction of the curl of the first and second pusher fibers 102A and 102B facing downward. This ensures that the front ends 105A and 105B of the first and second pusher fibers 102A and 102B contact the top surface 22 of the support substrate 20.

Figures 3A, 3B:
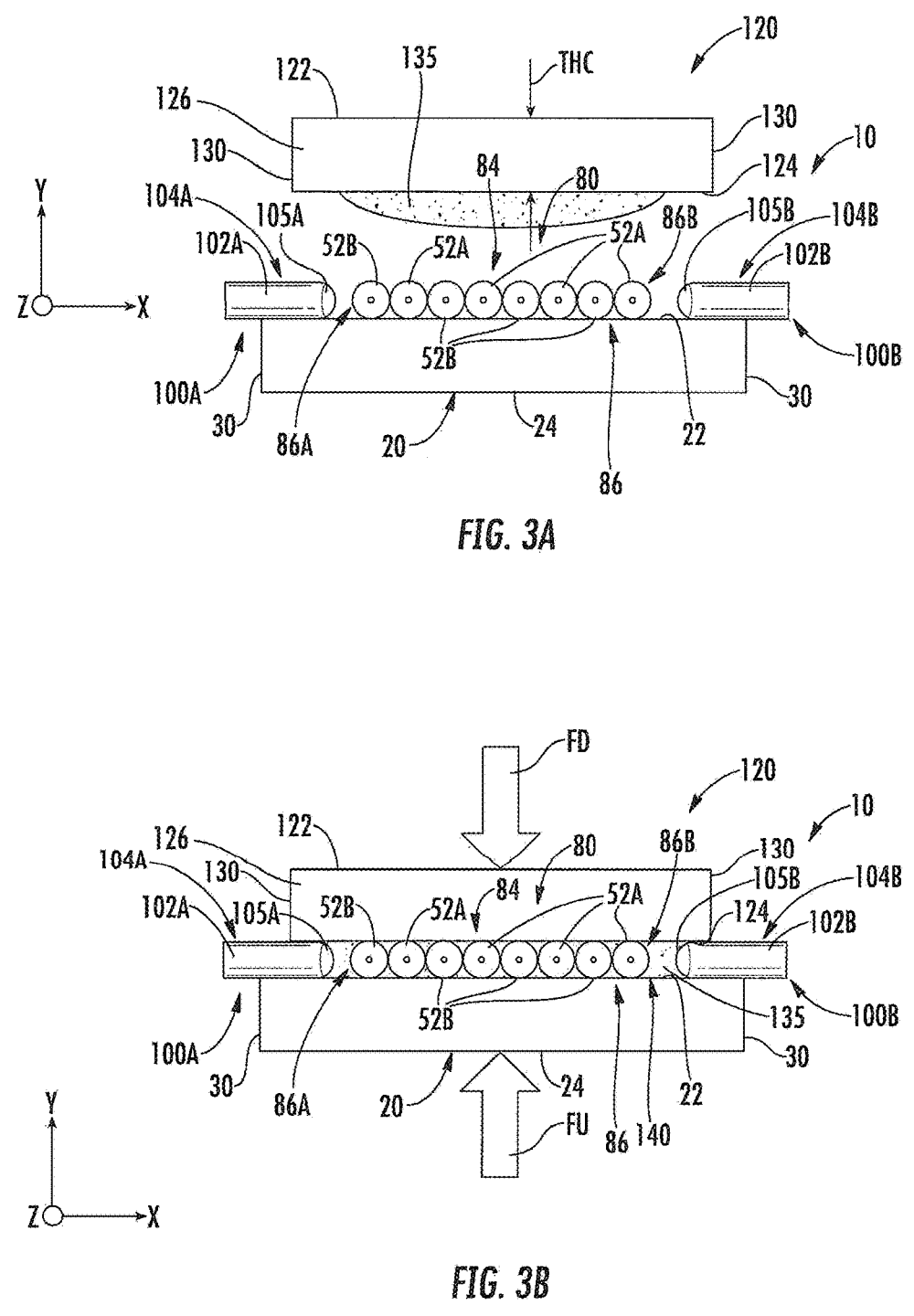

FIG. 3A is similar to FIG. 2B and shows the next step in the fabrication process, wherein a cover sheet 120 is added to the fiber ribbon assembly 10 of FIG. 2B. The cover sheet 120 has a top surface 122, a bottom surface 124, a front end 126, a back end 128 and opposite edges 130 (see also FIGS. 4A and 4B, introduced and discussed below). In an example, the cover sheet 120 is provided with a securing material 135 on its bottom surface 124 and then the cover sheet brought into contact with the top 82 of the interdigitated signal-fiber array 80 and the first and second fiber-pusher arrays 100A and 100B. Alternatively, the securing material 135 can be applied to the top 82 of interdigitated signal-fiber array and then the cover sheet 120 added to interdigitated signal-fiber array 80.

The addition of the cover sheet 120 to the structure of FIG. 2B defines a securing region 140 between the cover sheet 120 and the support substrate 20 in which the interdigitated signal-fiber array 80 and front-end portions 104A and 104B of the first and second pusher-fiber arrays 100A and 100B reside and are ultimately secured to each other as well as to the support substrate and the cover sheet. In an example, ultrasonic vibrations can be used to distribute the securing material 135 within the securing region 140. The ultrasonic vibrations can also be used to jostle the first and second signal fibers 52A and 52B to reduce any gaps G that exist between adjacent signal fibers.

The cover sheet 120 can be similar to or the same as the support substrate 20 and in an example can be made of glass. The cover sheet 120 can also have similar requirements for surface flatness and roughness as the support substrate 20. In an example, the cover sheet 120 has a thickness THC that is substantially the same thickness THS of the support substrate 20. In another example, the cover sheet 120 is substantially thicker than the support substrate 20 to meet requirements for the given connectorization application. For example, it may be important to minimize the distance between the top surface 122 of the cover sheet 120 and the center of the interdigitated signal-fiber array 80 to meet low profile requirements for a given interconnect device. The size (length and width) of the cover sheet 120 can be selected to match the size of the support substrate 20 or can be made smaller (as shown in FIGS. 3A and 3B) while still being sufficiently wide to completely cover the interdigitated signal-fiber array 80 as well as at least a portion (e.g., 1 mm to 2 mm) of the front-end portions 104A and 104B of the first and second fiber-pusher arrays 100A and 100B.

With reference now to FIG. 3B, once the cover sheet 120 is in place, a downward force FD is applied to the top surface 222 of the cover sheet in the −y-direction while an upward force FU is applied to the support substrate 20 in the +y-direction, thereby squeezing the fiber ribbon assembly 10 along the y-dimension. In this configuration, the curved first and second signal fibers 52A and 52B of the first and second signal-fiber arrays 50A and 50B and the curved first and second pusher fibers 102A and 102B of the first and second fiber-pusher arrays 100A and 100B are pushed flat while the securing material 135 is distributed throughout the available space within the securing region 140. The downward and upward forces FD and FU are such that the front-end portions 104A and 104B of the first and second fiber-pusher arrays 100A and 100B are still free move within the securing region 140.

Figure 4A:
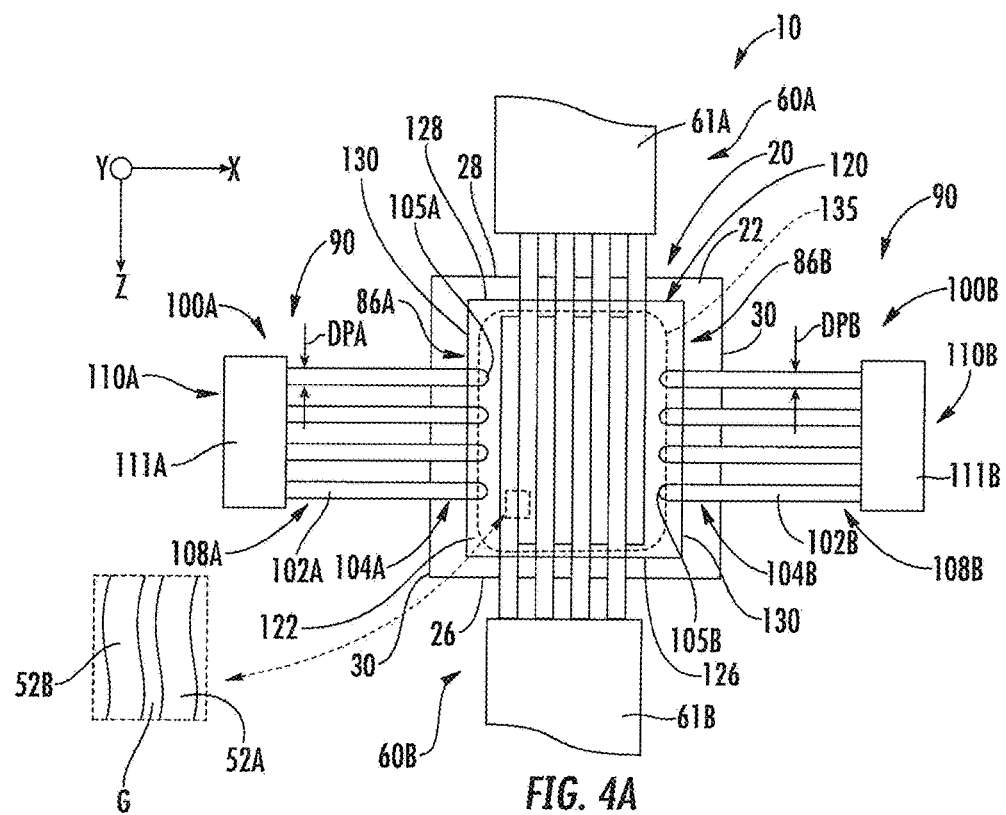
FIG. 4A is a top-down view of the fiber ribbon assembly of FIG. 3B and shows in the close-up inset a gap that can exist between adjacent signal fibers in the interdigitated signal-fiber array prior to lateral squeezing by the pusher fiber arrays.
Figure 4B:
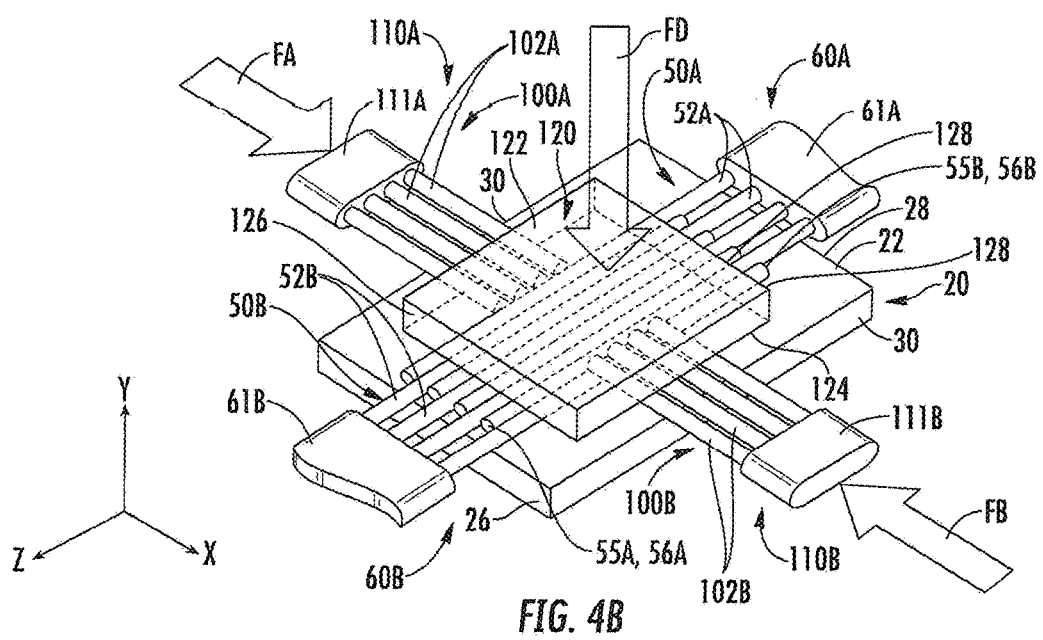
FIG. 4B is a top elevated view of the fiber ribbon array of FIG. 4A showing the initial application of a lateral squeezing force that brings the ends of the fiber-pusher arrays into contact with the edges of the interdigitated signal-fiber array.

FIG. 4A is a top-down view and FIG. 4B is an elevated view of the fiber ribbon assembly of FIG. 3B, with the securing material 135 distributed within the securing region 140. The front ends 105A and 105B of the first and second pusher fibers 102A and 102B of the first and second fiber-pusher arrays 100A and 100B reside proximate to and in an example equidistant from the respective edges 86A and 86B of the interdigitated signal-fiber array 80.

Figure 4C:
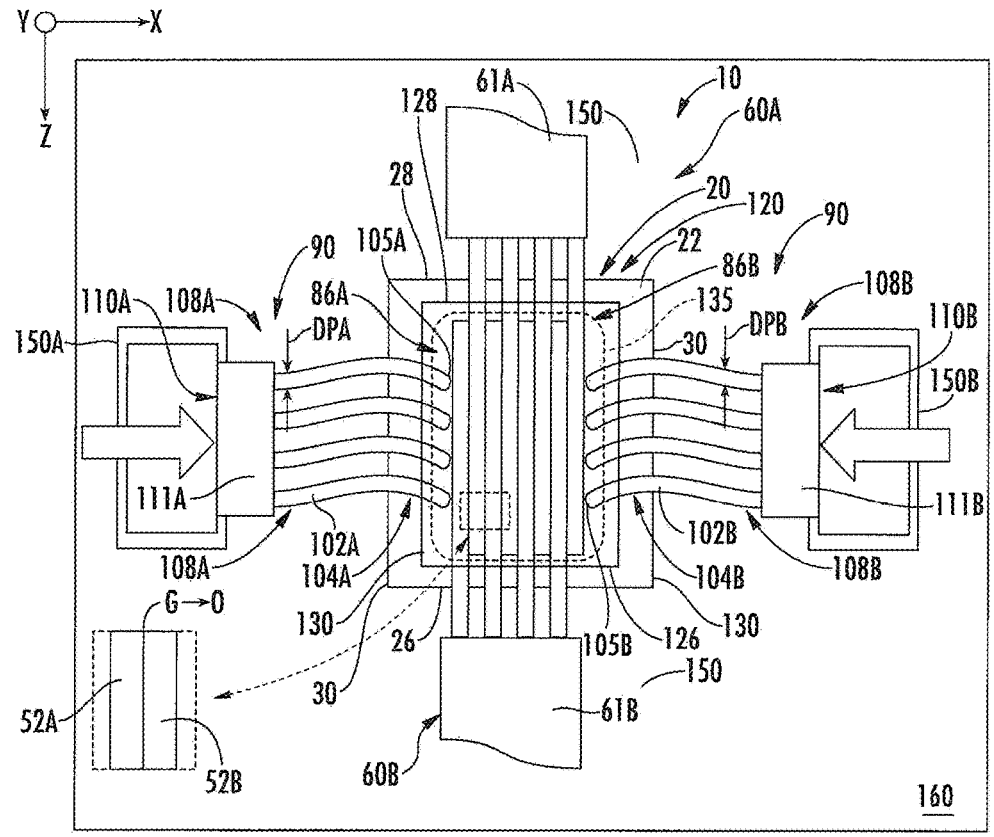
FIG. 4C is similar to FIG. 4A and shows how the lateral squeezing force causes the pusher fibers to bend as they squeeze together the signal fibers in the interdigitated signal-fiber array to remove any gaps that may exist between adjacent signal fibers.
Figure 4D:
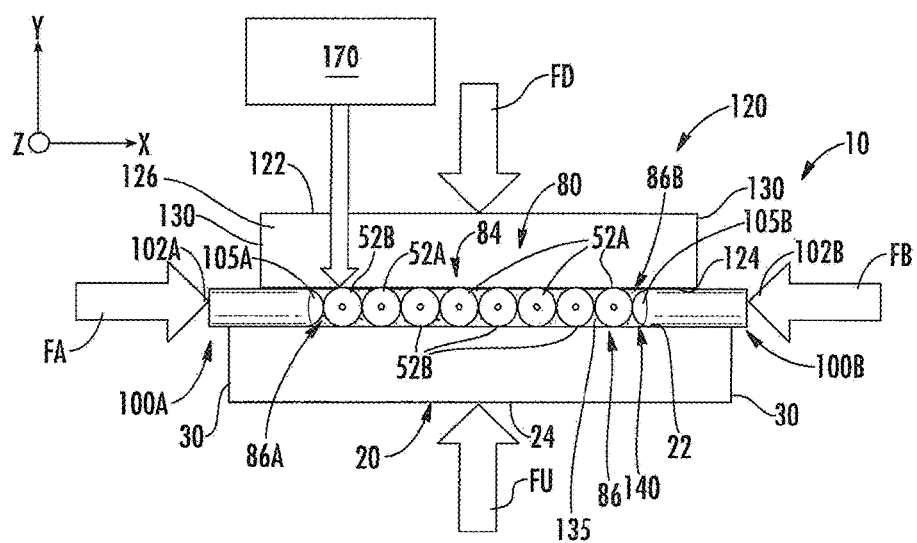
FIG. 4D is an x-y cross-sectional view of the fiber ribbon structure of FIG. 4C as it undergoes lateral squeezing, and also shows a viewing system used to view the securing region within the fiber ribbon assembly to monitor the fabrication process.

As shown in FIGS. 4B through 4D, squeezing forces FA and FB are respectively applied to the first and second fiber-pusher arrays 100A and 100B in the +x-direction and the −x-direction so that the front ends 105A and 105B of the first and second pusher fibers 102A and 102B respectively contact the edges 86A and 86B of the interdigitated signal-fiber array 80. The forces FA and FB can be increases until the first and second pusher fibers 102A and 102B bend and act like springs to squeeze the interdigitated signal-fiber array 80 in the +x and −x directions so that the interdigitated first and second signal fibers 52A and 52B are placed close contact with each other within the securing region 140. The bending of the first and second pusher fibers 102A and 102B of the first and second fiber-pusher arrays 100A and 100B ensures that the squeezing forces FA and FB are applied substantially uniformly at the edges 86A and 86B of the interdigitated signal-fiber array 80, while accommodating variations in the width of the interdigitated signal-fiber array along its length as gaps G between adjacent first and second signal fibers 52A and 52B are reduced. To compensate for the bending of the first and second pusher fibers 102A and 102B, the downward force FD on the cover sheet 120 can be increased as the squeezing forces FA and FB are increased.

The use of the first and second fiber-pusher arrays 100A and 100B instead of individual pusher fibers or individual pusher elements provides several advantages. One advantage is that the first and second fiber-pusher arrays 100A and 100B can be made to extend in the x-direction sufficiently far to help stabilize the cover sheet 120 on the fiber ribbon assembly 10. Another advantage is that the first and second fiber-pusher arrays 100A and 100B reduce the volume of securing material 135 needed in the securing region 140. This increases the structural integrity and reliability of the fiber ribbon assembly 10 because there is less securing material 135 that can swell and cause misalignments in the interdigitated first and second signal fibers 52A and 52B when exposed to high humidity levels. Another advantage is that the first and second fiber-pusher arrays 100A and 100B enable the application of compressive (squeezing) forces FA and FB along the length of the interdigitated signal-fiber array 80, thereby ensuring close contact between the interdigitated first and second signal fibers 52A and 52B along the length of the interdigitated signal-fiber array. Another advantage is that the multiple first and second pusher fibers 102A and 102B of the first and second fiber-pusher arrays 100A and 100B can support greater squeezing forces FA and FB than just a single fiber.

The squeezing forces FA and FB may be intentionally limited to not exceed a select maximum value. With reference to FIG. 4C, this can be accomplished in one example by gripping the first and second fiber-pusher arrays 100A and 100B in respective movable first and second fixtures 150A and 150B that are magnetically mounted to a metallic base plate 160. The squeezing forces FA and FB are applied by moving the metallic base plates 160 inward toward each other, thereby causing the first and second fiber-pusher arrays 100A and 100B to squeezes the interdigitated signal-fiber array 80. At some point, the squeezing forces FA and FB will exceed the shear strength of the first and second magnetically mounted grip fixtures 150A and 150B, causing them to slip over the magnetic base plate 160.

In an example illustrated in the end-on view of FIG. 4D, a viewing system 170, such as an optical microscope or a digital imaging system or machine vision system, can be used to observe the process of squeezing the interdigitated signal-fiber array 80 using the first and second fiber-pusher arrays 100A and 100B. This observation is made convenient by using a transparent glass material for the cover sheet 120. The lateral fiber squeezing process can be terminated when the gaps G between all neighboring first and second signal fibers 52A and 52B in the interdigitated signal-fiber array 80 are eliminated (see FIG. 4C, where "G→0"). Alternatively, based on empirical data, the applied force and/or displacement of the first and second fiber-pusher arrays 100A and 100B can be increased over time until a maximum value is obtained such that full contact (G=0) of the first and second signal fibers 52A and 52B in the interdigitated signal-fiber array 80 is assured. A similar force and/or displacement profile can be employed for positioning the cover sheet 120 during the lateral fiber squeeze alignment process.

After all gaps G between all neighboring (adjacent) first and second signal fibers 52A and 52B in the interdigitated signal-fiber array 80 are substantially eliminated by the lateral squeezing process (i.e., G→0), the components of the fiber ribbon assembly 10 can be secured to one another by curing the securing material 135. In an example, the securing material 135 comprises a UV adhesive and a UV radiation beam 136 is used to irradiate the securing material (e.g., through the substrate 20 and/through the cover 120) to cure the UV adhesive and permanently attach the first and second signal-fiber arrays 50A and 50B and the first and second fiber-pusher arrays 100A and 100B to the cover sheet 120 and to the support substrate 20. The securing material 135 may also require a longer thermal cure to completely crosslink, but an initial UV tack can ensure that precision fiber array alignment is maintained through any subsequent curing processes. In another example, the securing material 135 can be allowed to cure on its own. In another example, the securing material 135 is heat-curable and heat is used to cure the securing material.

An advantage of pre-applying the securing material 135 in the form of a UV-curable adhesive to the bottom surface 124 of the cover sheet 120 is that immediately after the cover sheet is brought into contact with the top 82 of the interdigitated signal-fiber array 80, the entire structure can be exposed to UV radiation 136 to immediately cure or at least partially cure the securing material. This can be important in situations where the securing material 135 can flow via wicking and capillary action to reach outside of the securing region 140. This can occur when fiber array alignment members such as external V-groove blocks or hold-downs (not shown) are positioned immediately adjacent the securing region 140. The curing or partial curing the securing material can be used to reduce or prevent such unwanted flow of the securing material.

Figure 5A:
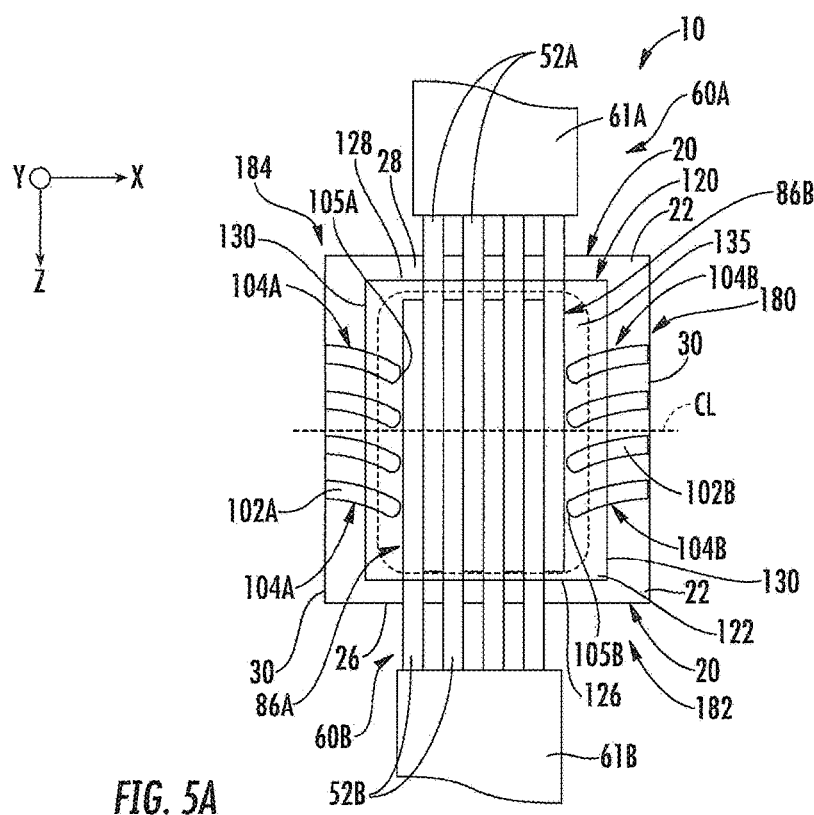
FIG. 5A is a top-down view of an example fiber ribbon assembly after the interdigitated signal-fiber array has been secured within the securing region and the pusher fibers cut, and showing a cutting line along which the fiber ribbon assembly can be diced (cut) to form two fiber array assemblies.

When the securing material 135 is fully cured, the back-end portions 108A and 108B of the first and second fiber pusher arrays 100A and 100B that extend beyond the edges 30 of the support substrate 20 can be removed, as shown in FIG. 5A. This leaves just the front-end portions 104A and 104B residing on the support substrate 20. In an example, the first and second pusher fibers 102A and 102B can be broken by scoring and cleaving, or by mechanically sawing or grinding excess fiber material away or by laser cutting. Additional adhesive or potting material (not shown) may be applied to the exposed first and second pusher fibers 102A and 102B where they exit the cover sheet 120 to prevent them from being damaged during subsequent processing steps and handling. The additional adhesive or potting material can also be used to cover and protect any portion of the fiber ribbon assembly 10 that may be vulnerable to damage during the fabrication process.

At this point in the fabrication method, the support substrate 20, the front-end portions 104A and 104B of the first and second fiber-pusher arrays 100A and 100B, and the cover sheet 120 define a ferrule structure ("ferrule") 180 that disposed about the interdigitated signal-fiber array 80, which resides within the securing region 140. The ferrule 180 has a front end 182 and a back end 184, with the securing region 140 defining a ferrule interior. Thus, the interdigitated signal-fiber array 80 can be said to reside within a ferrule interior 140. Since the ferrule supports multiple signal fibers 52A and/or 52B, the ferrule 180 constitutes a multifiber ferrule.

Figure 5B:
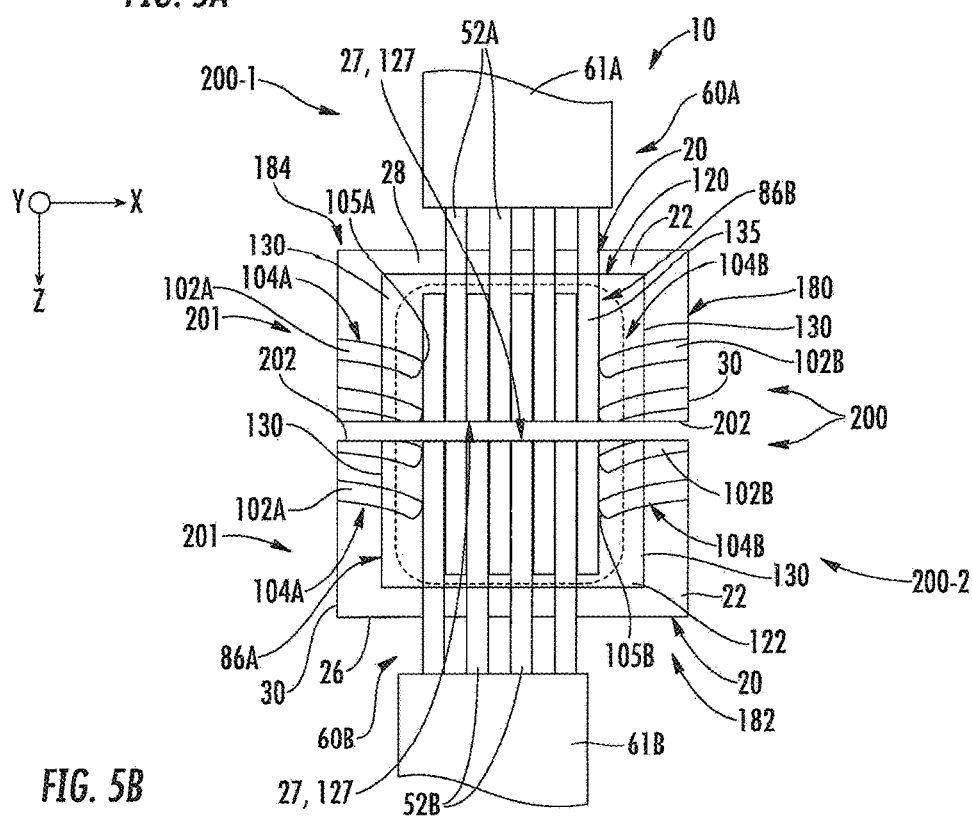

FIG. 5A also shows a cutting line CL along which the fiber ribbon assembly 10 can be cut to define two fiber array assemblies 200, i.e., 200-1 and 200-2, as shown in the top-down views of FIGS. 5B and 5C. The cutting line CL of FIG. 5A runs in the x-direction and through the ferrule 180 and is thus perpendicular (transverse) to the first and second signal fibers 52A and 52B, which run in the z-direction. In an example, the cutting line CL cuts the ferrule 180 in half. The cutting plane formed by cutting the ferrule 180 in half may also be tilted by, for example rotating the cutting plane about the x and/or y axes. Each fiber array assembly 200 has a front-end section 201 with a front end 202, which is defined in part by the new front ends 26 and 126 of the support substrate 20 and the cover sheet 120 formed by cutting the fiber ribbon assembly 10 along the cutting line CL. In an example, the front-end section 201 can include a portion of the corresponding first or second multifiber cable 60A or 60B.

Figure 5D:
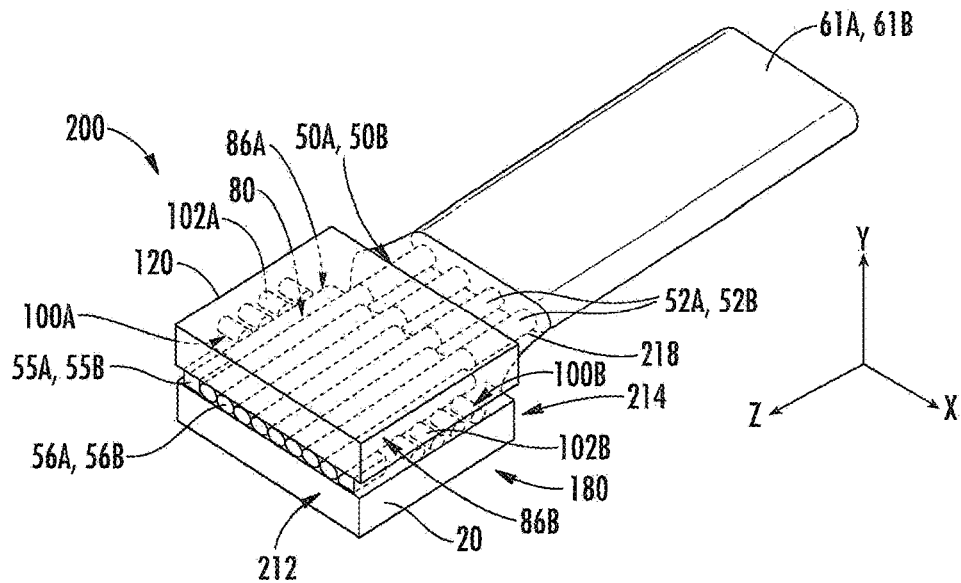
FIG. 5D is an elevated view of one of the fiber array assemblies of FIG. 5C.
Figure 5E:
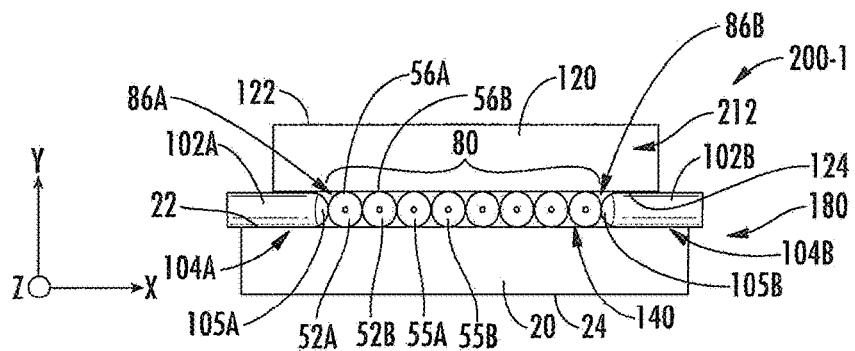
FIGS. 5E and 5F are front-on views of the two fiber array assemblies of FIGS. 5B and 5C.
Figure 5F:
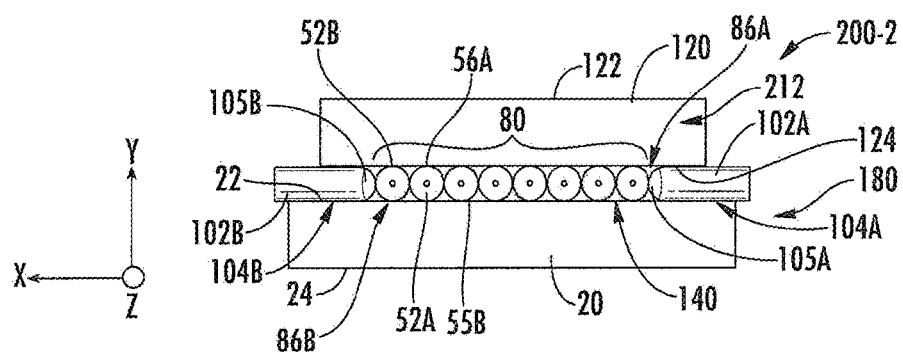

FIG. 5D is an elevated view of one of the fiber assemblies 200 of FIG. 5C while FIGS. 5E and 5F are front-on views of fiber assemblies 200-1 and 200-2, respectively. The first and second signal fibers 52A and 52B in each of the two fiber array assemblies 200-1 and 200-2 now have new front ends 55A and 55B and new end faces 56A and 56B. In an example, the cut is made using a diamond blade. The cut along the cutting line CL can be made perpendicular to the interdigitated signal-fiber array 80, or at an angle (e.g., 8°) to minimize back reflections. The saw blade can also be tilted to create a beveled end faces 56A and 56B of the first and second signal fibers 52A and 52B. The end faces 56A and 56B of the first and second signal fibers 52A and 52B of the two fiber array assemblies 200-1 and 200-2 can be polished to achieve an acceptably smooth face for low loss optical interconnections. The polishing can be mechanical (e.g., using a diamond polishing wheel or gang polishing fixture) or can be laser based. It is noted that the pitch PF of the optical fibers in the example fiber array assemblies 200-1 and 200-2 is PF=2DSA=2DSB, i.e., twice the diameter of the first and second signal fibers 52A and 52B. Note that for the fiber array assembly 200-1, the first signal fibers 52A are active signal fibers while the cut portions of the second signal fibers 52B are not used as active signal fibers and now serve as spacers between the active first signal fibers 52B. Likewise, for the fiber array assembly 200-2, the second signal fibers 52B are the active signal fibers while the cut portions of the second signal fibers 52A are not used as active signal fibers and now serve as spacers between the active second signal fibers.

Figure 6A:
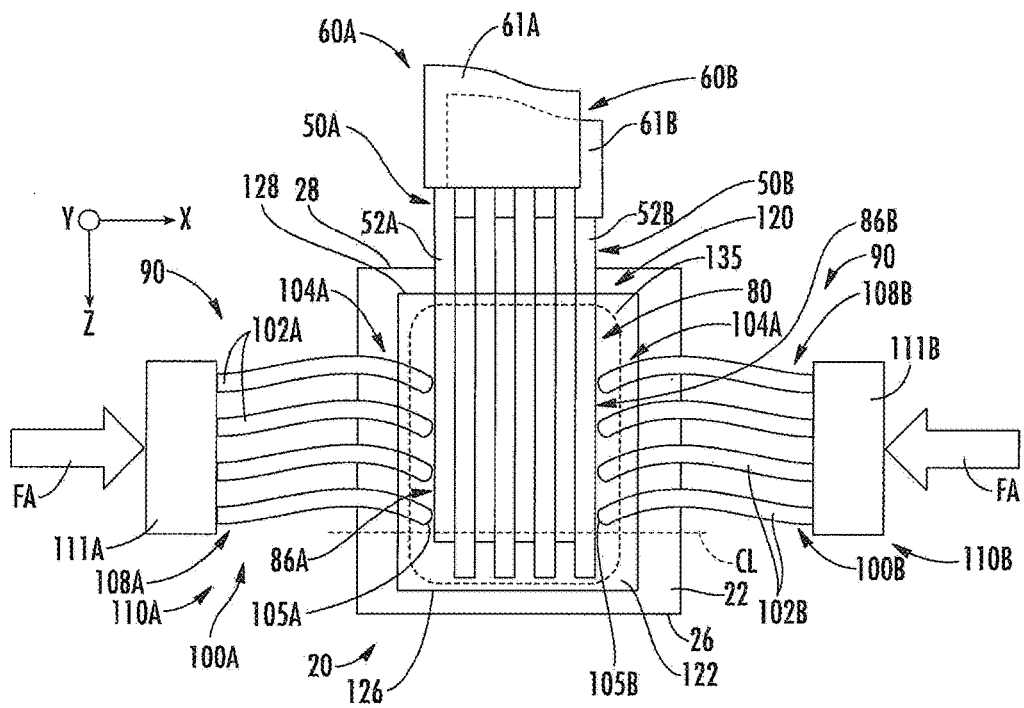
FIG. 6A is a top-down view of an example fiber ribbon assembly wherein the two multifiber cables are arranged at the same end of the support substrate.
Figure 6B:
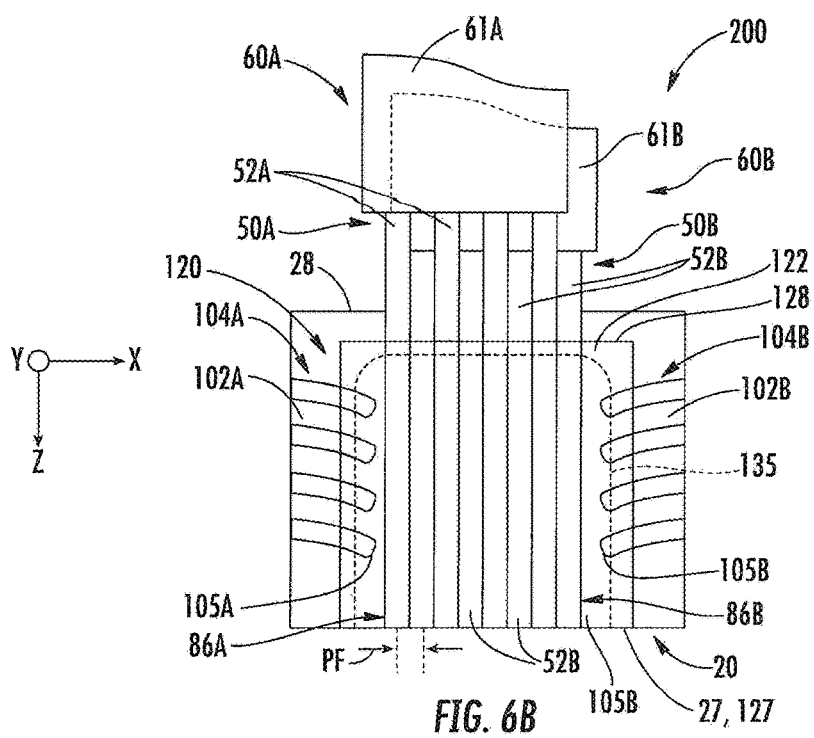
FIG. 6B is a top-down view of the resulting fiber array assembly formed from the fiber ribbon assembly of FIG. 6A.

FIG. 6A is similar to FIG. 4B and shows a top-down view of another embodiment of the fiber ribbon assembly 10 where both the first and second signal-fiber arrays 50A and 50B reside at the same end (e.g., the back end 28) of the support substrate 20. This configuration enables the first and second signal fibers 52A and 52B within the interdigitated signal-fiber array 80 to have a pitch PF=DA=DB. Unlike the previous configuration for the fiber ribbon array 10 where the first and second signal-fiber arrays 50A and 50B were on opposite ends of the support substrate 20, in this case only a single precision fiber array assembly 200 can be obtained from each fiber ribbon assembly 10, as shown in FIG. 6B. Note also that the resulting fiber array assembly 200 does not include spacers (e.g., sections of fibers) that reside between the first or second signal fibers 52A or 52B. In an example, the cutting line CL can reside close to the front end 26 of the support substrate 20.

Figure 6C:
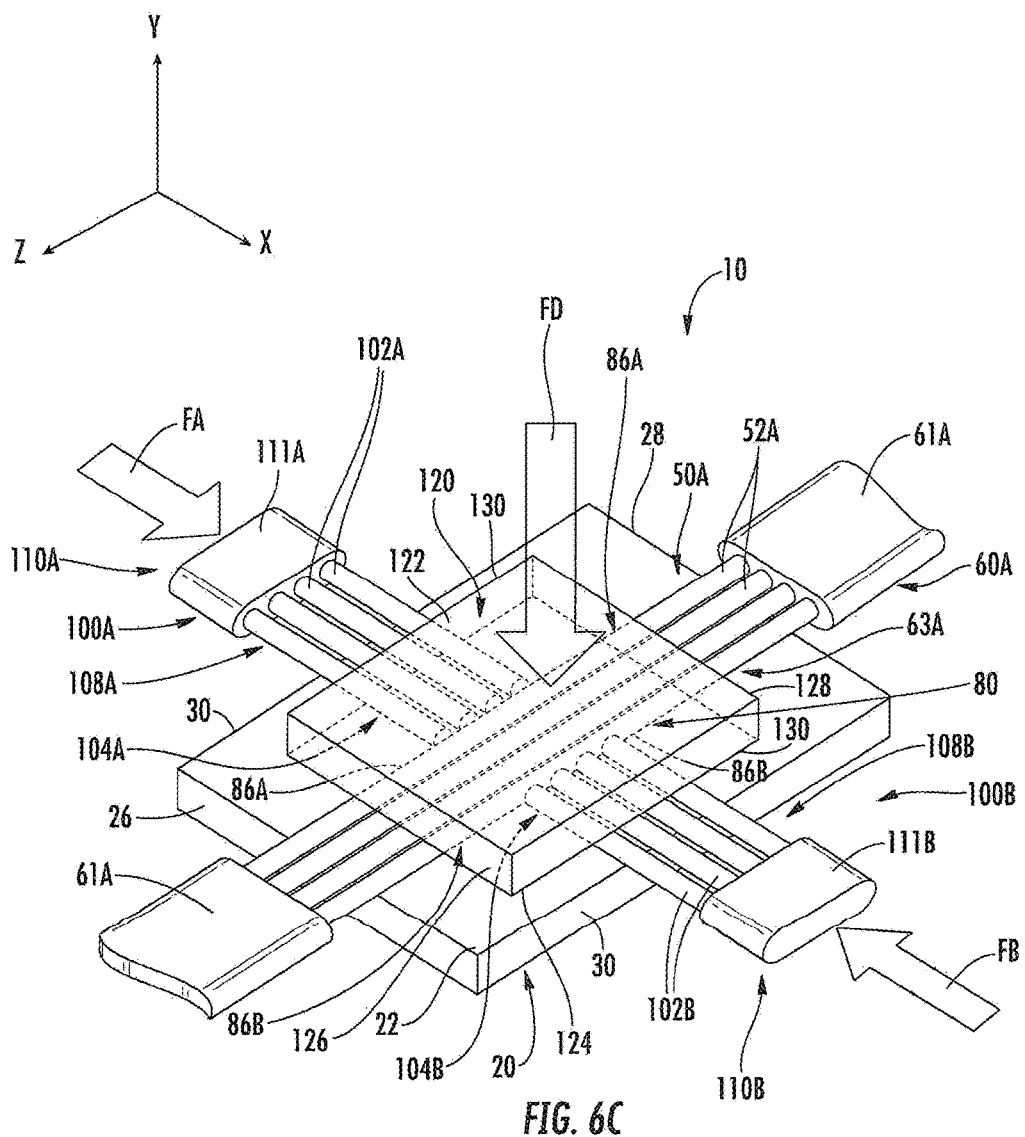
FIG. 6C is a top elevated view that shows an example fiber ribbon assembly that employs a multifiber cable having an exposed middle section that resides on the support substrate.

FIG. 6C is a top elevated view of an example fiber ribbon assembly 10 that shows an example of where a middle section 63A of the cable jacket 61A from a single (first) multifiber cable 60A has been removed. This is sometimes referred to as "window stripping" and can be accomplished by laser stripping processes or localized exposure to flowing hot gas (e.g., N2). By stripping the signal fiber ribbon cable 60A at a middle location, the ribbon cable can be laid across the support substrate 20 so that the exposed (first) signal fibers 52A are supported directly on the top surface 22 of the support substrate.

Figure 6D:
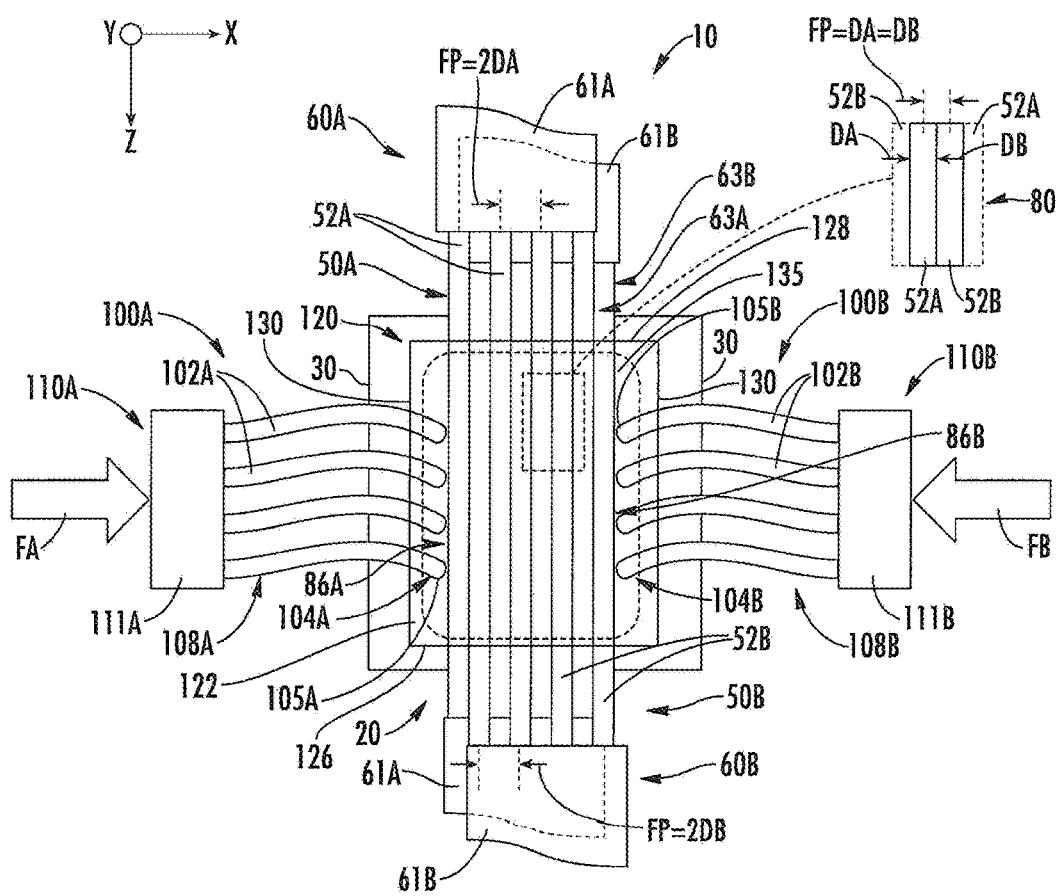
FIG. 6D is a top-down view of an example fiber ribbon assembly that employs two multifiber cables having an exposed middle section where the respective signal fibers of the two multifiber cables are interdigitated to form the interdigitated signal-fiber array.

FIG. 6D is a top-down view of an example fiber ribbon assembly 10 similar to that of FIG. 6C and that shows an example employing the first and second multifiber cables 60A and 60B each with an exposed middle section 63A and 63B and a fiber pitch of FP=2DA=2DB. The first and second signal fibers 52A and 52B are interdigitated at the exposed middle sections 63A and 63B to define the interdigitated signal-fiber array 80, where the interdigitated first and second signal fibers 52A and 52B define a fiber pitch of FP=DA=DB when the fiber ribbon assembly 10 is diced along the cutting line CL to form two fiber array assemblies 200-1 and 200-2. Note that in the configuration of the fiber ribbon assembly 10 of FIG. 6D, neither of the signal fibers 52A and 52B are used as spacers, i.e., both signal fibers are active signal fibers in each of the two fiber array assemblies 200-1 and 200-2.

Fiber-Pusher Array End Shapes and Profiles

Figure 7A:
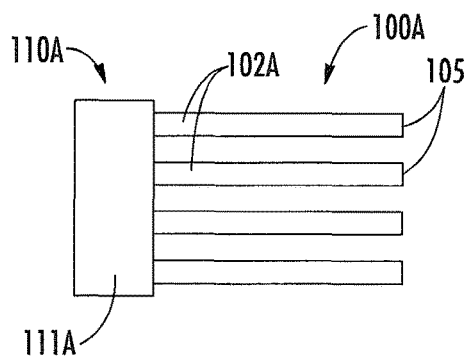
FIGS. 7A through 7D are top-down views of example fiber-pusher arrays where the front ends of the pusher fibers have different shapes and/or different lengths.
Figure 7B:
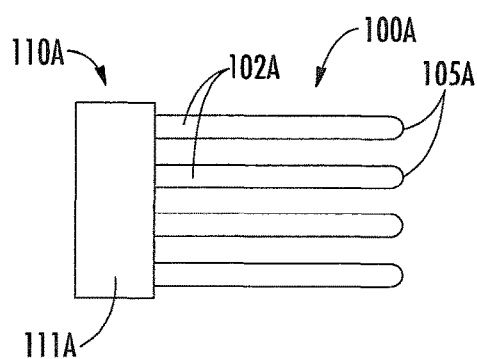

As described above, the front ends 105A and 105B of the pusher fibers 102A and 102B of the fiber-pusher arrays 100A and 100B can be shaped to improve contact with corresponding edges 86A and 86B of the interdigitated signal-fiber array 80. FIGS. 7A and 7B are top-down views of an example fiber-pusher array 100A wherein the front ends 105A are squared-off or "square" (FIG. 7A) and rounded-off or "round" (FIG. 7B).

The front ends 105A and 105B of the first and second pusher fibers 102A and 102B can be shaped by a mechanical operation (e.g., mechanical cleaving, grinding and/or polishing), a laser-based operation, or a wet chemical etch operation. The front ends 105A and 105B can be shaped so that they are spherical, pointed, or have cylindrical sections, where the cylindrical axis can be oriented parallel or perpendicular to the plane of the fiber pusher array.

Figure 7C:
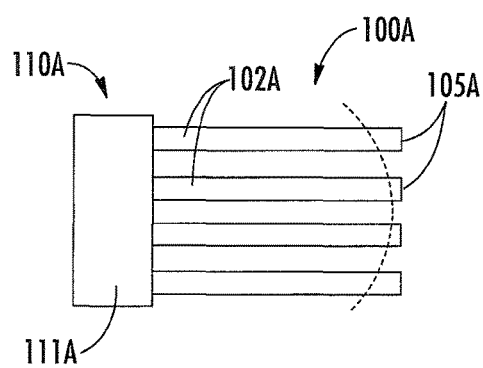
Figure 7D:
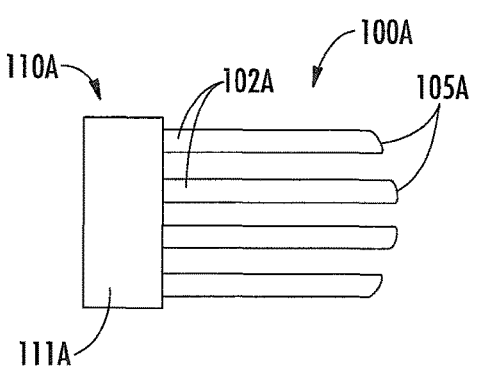

The length of the different first and second pusher fibers 102A and 102B within the given first and second fiber-pusher arrays 100A or 100B can be independently modified to create arbitrary profiles at the end of the fiber pusher array. FIG. 7C shows a target circular profile and FIG. 7D shows the final circular profile for the end of the fiber-pusher array 100A. In an example, the desired profile can be formed using a laser beam to cut or trim the first or second pusher fibers 102A or 102B. A curved end profile for first and second fiber-pusher arrays 100A and 100B may be preferred for assembly conditions where the position and/or angle of the interdigitated signal-fiber array 80 on the support substrate 20 can vary substantially during the fabrication process.

Support Substrate and Cover Sheet Configurations

The support substrate 20 and cover sheet 120 can include features that provide additional functionality to the fiber ribbon assemblies 10 and the fiber array assemblies 200 that are later integrated into more complex interconnect assemblies and packaging to form interconnect devices. FIG. 8A is similar to FIG. 6D and shows two fiber array assemblies 200-1 and 200-2 as formed from an example fiber ribbon assembly 10 wherein the support substrates 20 include two different types of assembly features 220 at different locations at or near the perimeter 32 of the support substrates 20. The assembly features 220 are generally configured to provide one or more of a coarse alignment, a mechanical retention of the fiber array assembly to a packaging component, or an optical fiber strain relief. In various examples, the assembly features 220 can be in the form of a notch, a step, a cut-out, a through hole, a recess or like structure. The assembly features 220 can be formed using laser cutting or mechanical grinding operations.

Figure 8B:
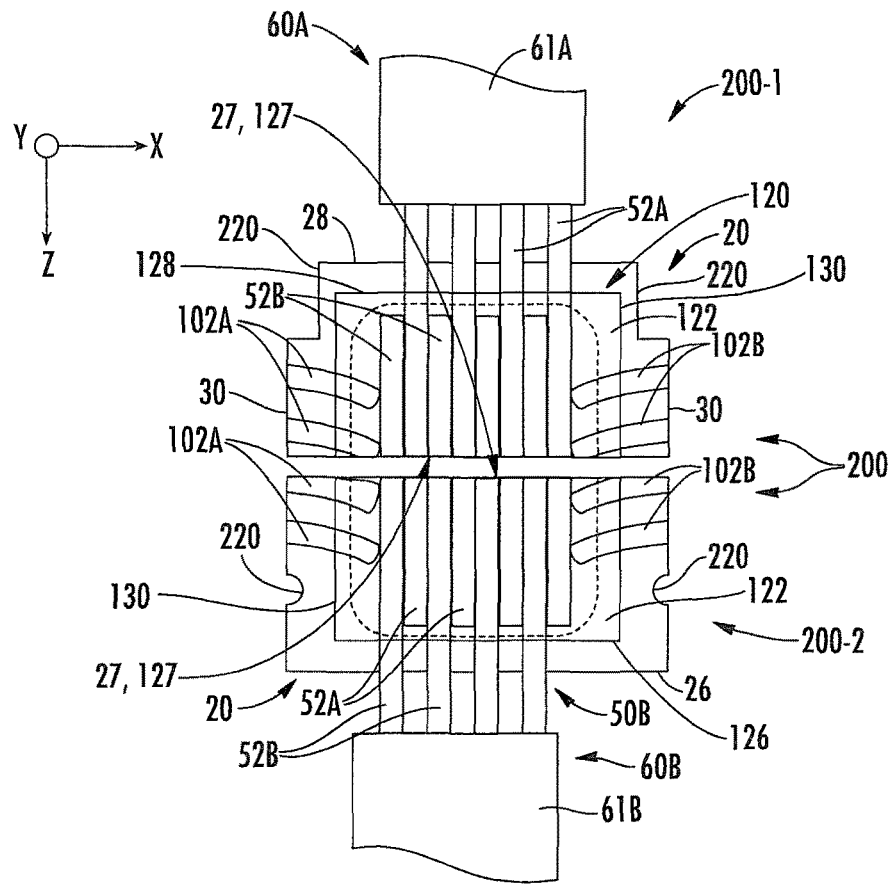
FIG. 8B is a front-on view of an example fiber array assembly that shows an example assembly feature in the form of steps in the bottom surface of the cover sheet at the cover sheet edges.
Figure 8B:
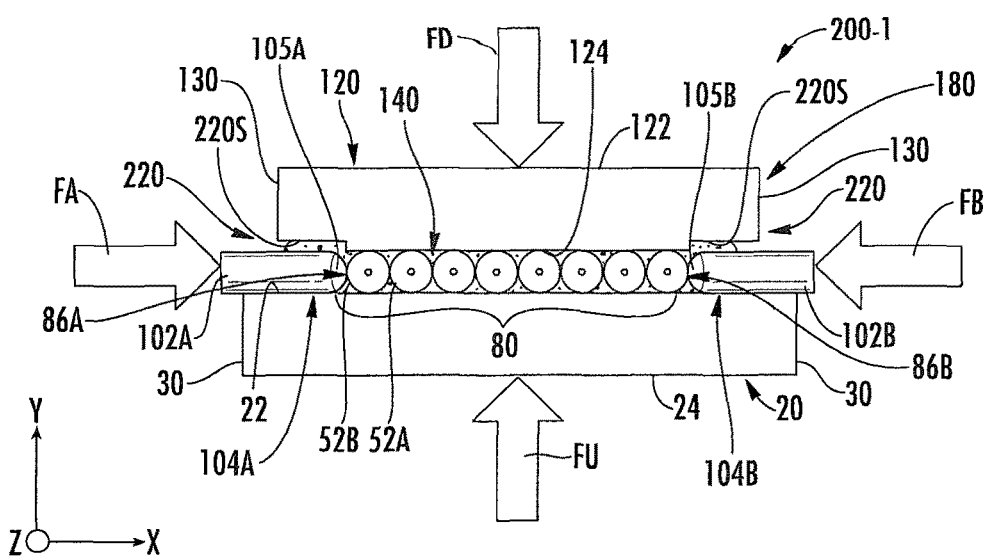

FIG. 8B is a front-on view of an example fiber array assembly 200-1 of FIG. 8A and shows an example assembly feature 220 in the cover sheet 120, wherein the assembly feature is in the form of steps 220S formed in the bottom surface 124 of the cover sheet 120 at each of the edges 30. The steps 220S can be shallow, e.g., 2 microns or 3 microns. This serves to make the cover sheet 120 thinner adjacent the edges 130, thereby providing a small amount of mechanical relief for the fiber-pusher arrays 100A and 100B that are sandwiched between the support substrate 20 and the cover sheet 120. The assembly features 220 can be employed to ensure the use of standard-sized fibers for the first and second pusher fibers 102A and 102B in the first and second fiber-pusher arrays 100A and 100B without the risk of mechanical interference from the cover sheet 120 and the support substrate during fabrication of the fiber ribbon assembly 10.

Figure 8C:
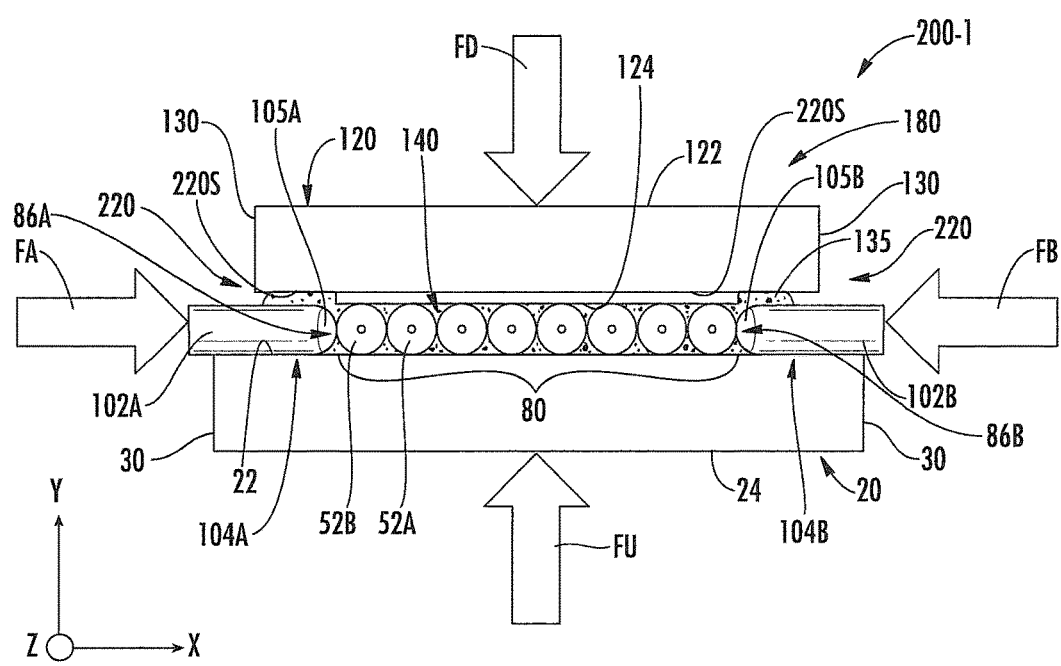
FIG. 8C is an x-y cross-sectional view of an example fiber array assembly that shows an example assembly feature in the form of shim attached to the bottom surface of the cover sheet.

FIG. 8C is similar to FIG. 8B and shows an example where the assembly feature 220 is in the form of a shim 220SH disposed on the bottom surface 124 of the cover sheet 120. The shim 220SH is sized to just cover the first and second signal fibers 52A and 52B of the first and second signal-fiber arrays 50A and 50B so that the same effect of increased mechanical clearance of the first and second pusher fibers 102A and 1023 of the first and second fiber-pusher arrays 100A and 100B is obtained as for the case of an assembly features 220 in the form of the steps 220S. The shim 220SH can be in the form of a thin glass sheet or thin glass layer. The shim 220SH can also be formed by a layer of dense polymer or a layer of adhesive that is spun on or otherwise deposited prior to adding the cover sheet 120 to the fiber ribbon assembly 10.

The use of a shim 220SH in the form of a thin glass sheet can provide a way of making a very low profile fiber array assembly 200 by separating the cover sheet 120 from the shim and then removing the cover sheet. In this approach, care would be needed to ensure that the securing material 135 only contacted the shim 220SH and not the cover sheet 120.

An aspect of the method of forming the fiber ribbon assemblies 10 disclosed herein can include measuring the geometrical characteristics (e.g., diameter, circularity, core-clad concentricity, etc.) of the first and second signal fibers 52A and 52B for a collection of fiber ribbon cables and then selecting the fiber ribbon cables that have the best geometrical characteristics. For example, one can measure a collection of 100 fiber ribbon cables and then select the two whose signal fibers have the least variation of geometrical characteristics compared to each other. One can also group pairs or sets of fiber ribbon cables that have the least variation in geometrical characteristics relative to one another. This aspect of the method can lead to fiber ribbon assemblies and fiber array assemblies that can meet tighter precision requirements and provide a higher yield for the kinematic assembly process.

A similar measurement and selection process can be carried out for fiber ribbon assemblies used for the fiber pusher arrays.

Glass Pusher Sheets

In the embodiments of the fiber ribbon assembly 10 and the fiber array assemblies 200 described above, the fiber pusher device 90 included first and second fiber-pusher arrays 100A and 100B that laterally squeezed the interdigitated signal-fiber array 80 so that the first and second signal fibers 52A and 52B were tightly contacted with each other prior to securing the first and second signal fibers of the interdigitated signal-fiber array 80 within the securing region 140.

Figure 9:
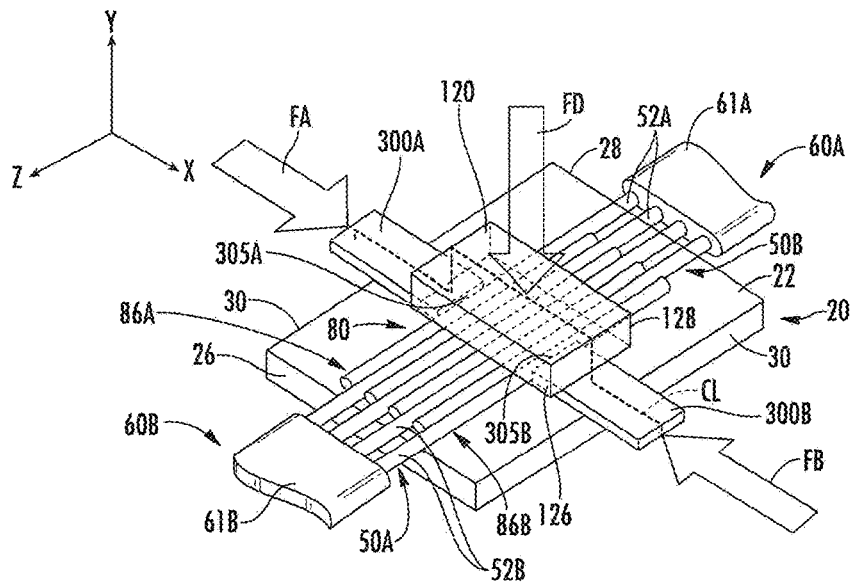
FIG. 9 is a top elevated view of an example fiber ribbon assembly similar to that shown in FIG. 2A except that the fiber-pusher arrays have been replaced by glass pusher sheets.

FIG. 9 is a top elevated view of an example fiber ribbon assembly 10 similar to that shown in FIG. 2A and that shows another example of the fiber pusher device 90 wherein the first and second fiber-pusher arrays 100A and 100B are replaced by first and second glass pusher sheets 300A and 300B. The first and second glass pusher sheets 300A and 300B having respective front ends 305A and 305B and respective thicknesses THGA and THGB, where in an example THGA=THGB=THG (see FIG. 11). Like the first and second fiber-pusher arrays 100A and 100B of the first example fiber pusher device 90, the first and second glass pusher sheets 300A and 300B of the second example fiber pusher device are selected so that the thickness THG is equal to or slightly thinner than the thickness THI of the interdigitated array 80.

Figure 10A:
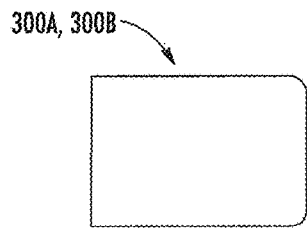
FIGS. 10A through 10D are top-down views that show different configurations of the glass pusher sheets.
Figure 10B:
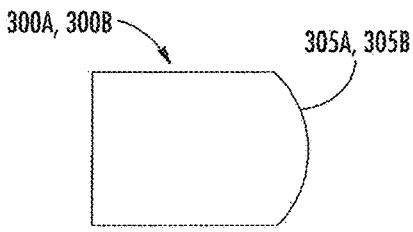
Figure 10C:
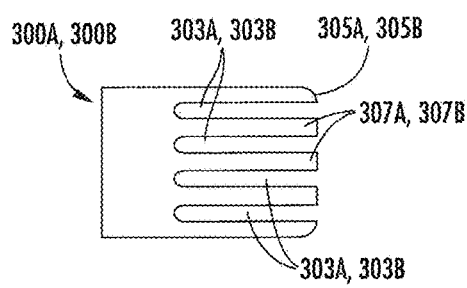
Figure 10D:
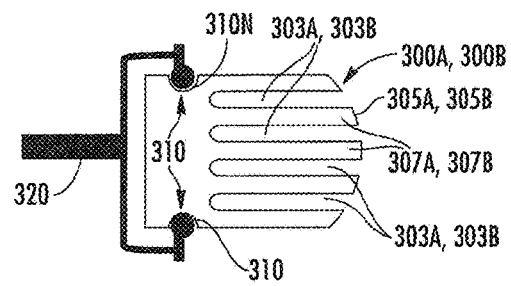

FIGS. 10A through 10D are top-down views of example first or second glass pusher sheets 300A or 300B having different shapes for the front ends 305A or 305B. In an example, laser cutting or glass cutting or glass grinding can be used to achieve a desired shape for the front ends 305A or 305B. FIGS. 10C and 10D show example embodiments where the first or second glass pusher sheet 300A or 300B includes slots 303A or 303B in the front ends 305A or 305B, which defines prongs 307A or 307B that mimic the flexible front-end portions 104A or 104B of the first or second pusher fibers 102A or 102B of the first or second fiber-pusher array 100A or 100B. The slots 303A or 303B can be formed using laser processing. FIG. 10D also shows the first or second glass pusher sheet 300A or 300B having assembly features 310, such as notches 310N that facilitate gripping of the glass pusher sheets using a gripping tool 320.

Figure 11:
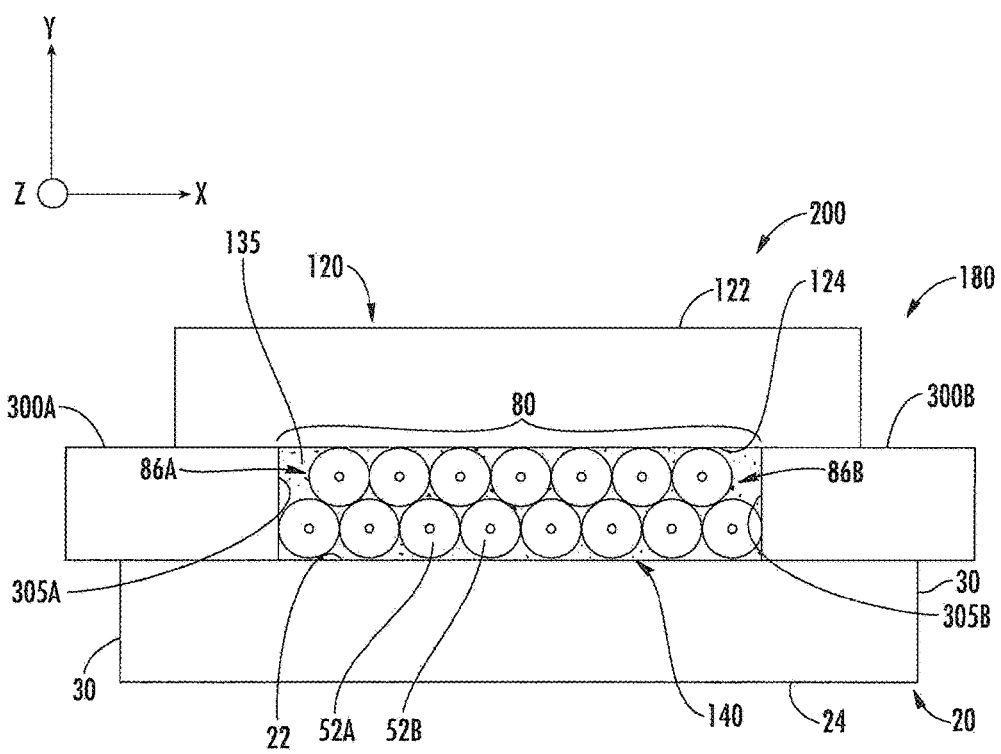
FIG. 11 is a cross-sectional view of an example fiber array assembly that includes glass pusher sheets and multiple rows of signal fibers.

An advantage of the first and second glass pusher sheets 300A and 300B is that they can readily be made with an arbitrary thickness THG. This feature allows for the fabrication of fiber ribbon assemblies 10 and fiber array assemblies 200 that include more than one row of first and/or second signal fibers 52A and/or 52B, such as two rows of first and second signal fibers as shown in the front-on of FIG. 11 to form a multilayer interdigitated signal-fiber array 80 with a thickness THI. While two rows of first and second fibers 52A and 52B are shown in FIG. 11 by way of example, three or more stacked rows of first and second signal fibers can also be employed, with the number of rows depending on the particular interconnection application involved.

Forming a Planar Lightwave Circuit Assembly

Figure 12A:
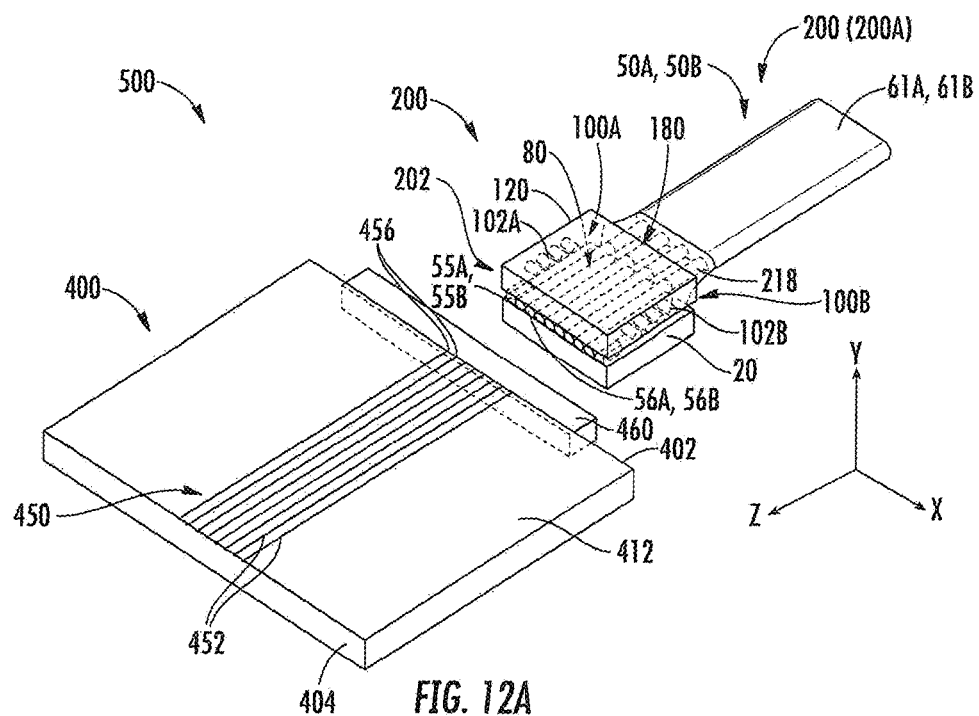
FIGS. 12A and 12B are elevated views that shows the fiber array assembly of FIG. 5D operably disposed relative to a planar lightwave circuit (PLC) as part of the process of forming a PLC assembly.
Figure 12B:
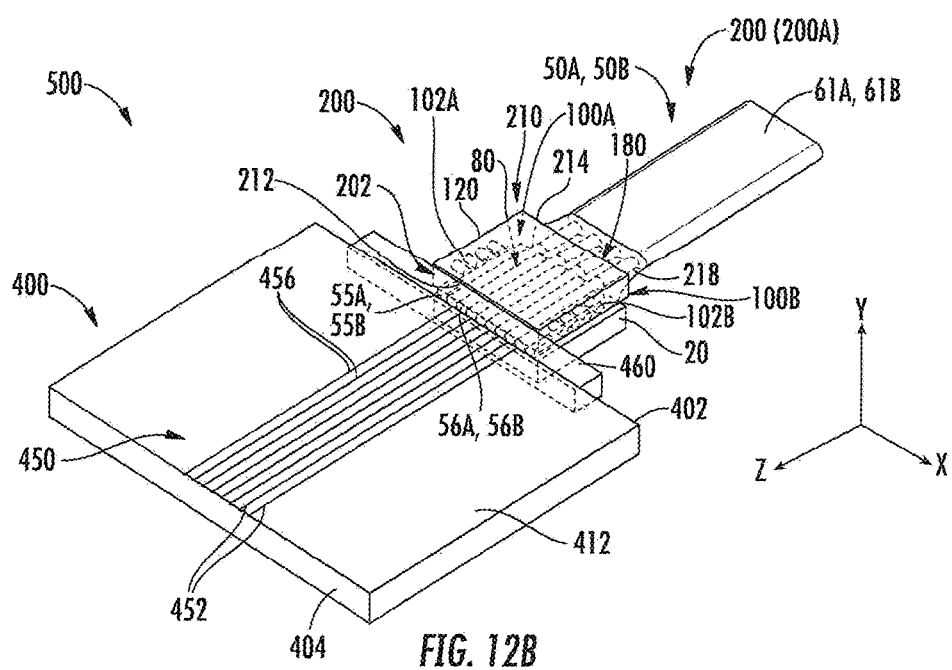

FIGS. 12A and 12B are elevated views that shows the fiber array assembly 200 of FIG. 5D operably disposed relative to a planar lightwave circuit (PLC) 400 as part of the process of forming a PLC assembly 500. FIG. 12A shows the fiber array assembly 200 in the process of operably engaging with the PLC 400 and FIG. 12B shows the fiber array assembly operably engaged with the PLC.

The PLC 400 has a front end 402, a back end 404 and a top surface 412 that supports an array 450 of optical waveguides ("waveguides") 452. The waveguides 452 have end faces 456 that reside at or proximate the front end 402. In an example, the optical waveguides 452 are supported in a silica layer (not shown) that defines the top surface 412 of the PLC 400. In an example, an attachment fixture 460 is supported by the PLC 400 to facilitate operably engaging the fiber array assembly 200 with the PLC 400. In an example, the attachment fixture 460 comprises a glass block attached to the top surface 412 of the PLC 400 at or proximate to the front end 402.

When the fiber array assembly 200 is operably engaged with the PLC 400, the end faces 56 of the first and second signal fibers 52A and 52B of the interdigitated signal-fiber array 80 are in contact with (or closely proximate to) and aligned with the end faces 456 of the waveguides 452 of the PLC. A securing material 135 can be disposed between the front end 202 of the fiber array assembly 200 and one or both the front end 402 of the PLC 400 and the attachment fixture 460 to attach the fiber array assembly to the PLC. In an example, the securing material 135 comprises an ultraviolet-curable adhesive that can be cured once alignment between the first and second signal fibers 52A and 52B of the fiber array assembly 200 and the waveguides 452 of the PLC 400.

Connectorized Fiber Array Assembly

Figure 13A:
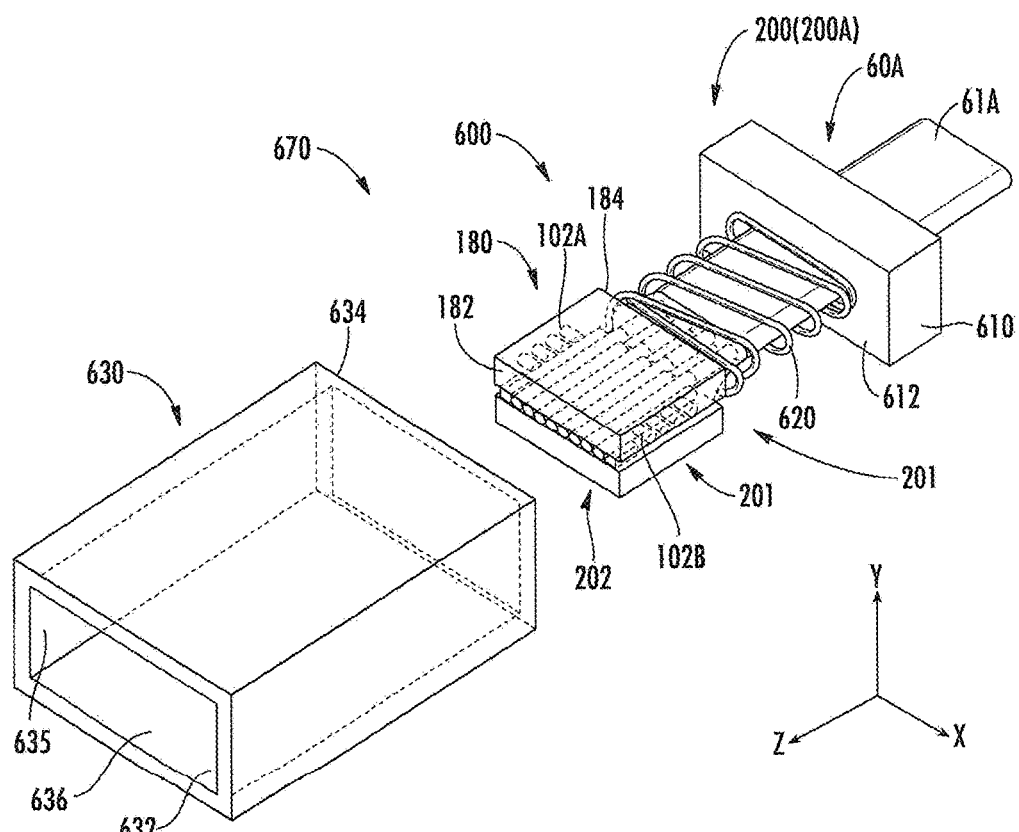
FIG. 13A is an elevated view that shows the fiber array assembly of FIG. 5D along with the basic components of an interconnect device in the process of being added to the front-end section of the fiber array assembly to form a connectorized fiber array assembly.

In an example, the fiber array assembly 200 can be connectorized by adding an interconnect device (e.g., a connector assembly) to the front-end section 201 of the fiber array assembly to form a connectorized fiber array assembly 670. FIG. 13A is an elevated view that shows the fiber array assembly 200 of FIG. 5D along with the basic components of an interconnect device 600 in the process of being added to the front-end section 201 of the fiber array assembly. Note that in this example, the front-end section 201 includes a portion of the (first) multifiber cable 60A, which can extend a substantial distance in the −z direction (e.g., one to several meters in the case of jumper cable) and is shown truncated in FIG. 13A (as well as in other of the Figures) for ease of illustration. The interconnect device 600 is shown by way of example as a connector assembly. Other configurations and types of interconnect devices 600 can also be effectively employed.

The interconnect device 600 includes a retaining member 610 secured to the multifiber cable 60A at a location spaced apart from the back end 184 of the ferrule 180. The retaining member 610 has a front end 612. A resilient member 620 resides between the front end 612 of the retaining member 610 and the back end 184 of the ferrule 180. In an example, the resilient member 620 is in the form of a spring that surrounds a portion of the multifiber cable 60A.

Figure 13B:
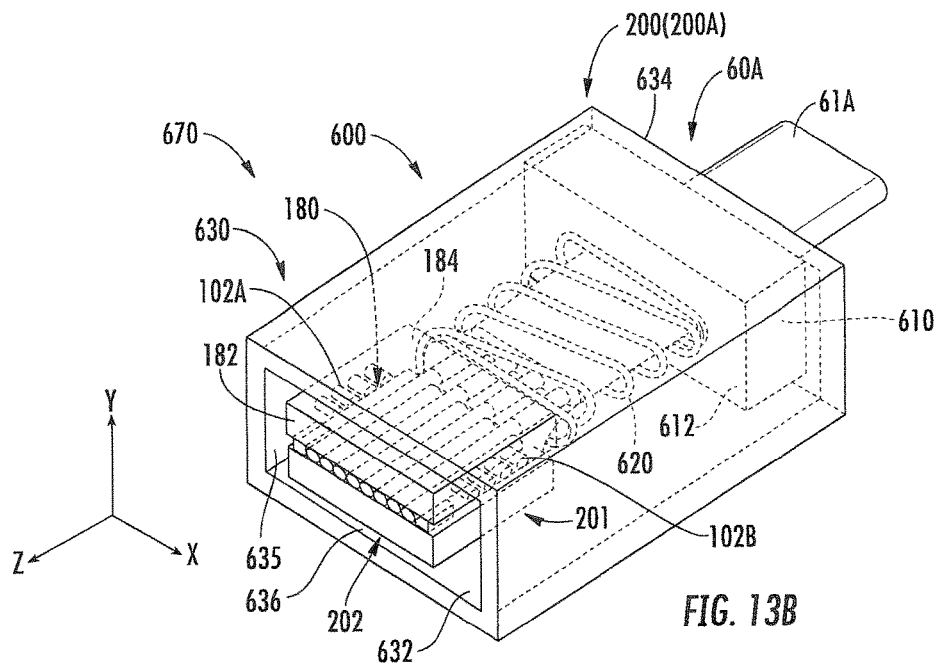
FIGS. 13B and 13C are front-elevated and back-elevated views of the interconnector housing in place over the other components of the interconnect device to form the connectorized fiber array assembly.
Figure 13C:
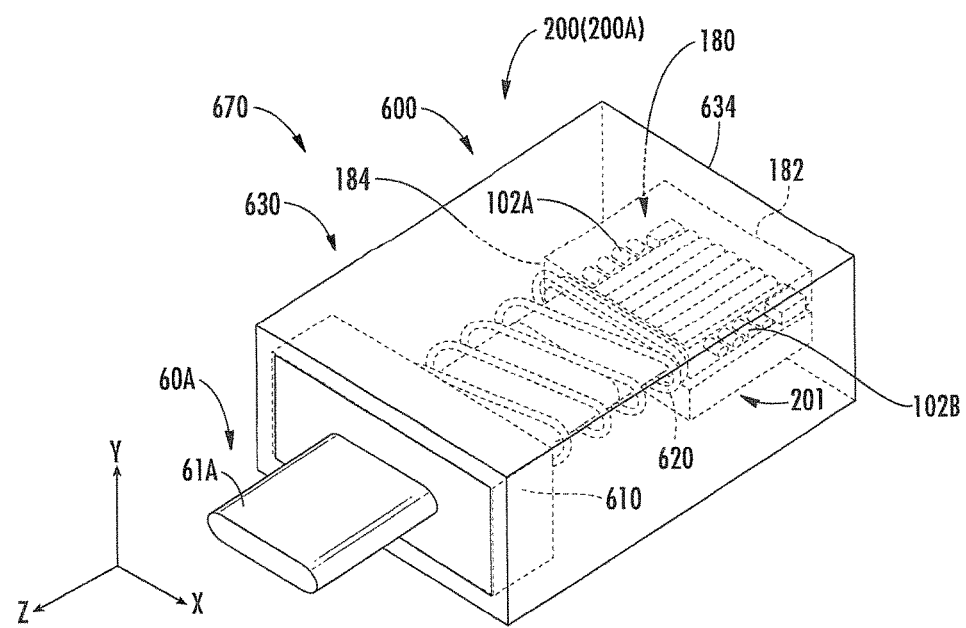

The interconnect device 600 also includes an interconnector housing 630 having an open front end 632, an open back end 634 and interior walls 635 that define an open interior 636. FIGS. 13B and 13C are front-elevated and back-elevated views of the interconnector housing 630 disposed in place over the front-end section 201 of the fiber array assembly to form the connectorized fiber array assembly 670. The retaining member 610 fits within the open back end 634 of the interconnector housing 630 and can be secured therein using either the securing material 135 or by using attachment features, such as a snap-and-lock mechanism. The open front end 632 of the interconnector housing 630 resides at or proximate to the front end 182 of the ferrule 180.

In an example, the interconnector housing 630 can include alignment features (not shown), such as slots, notches, etc. on the interior walls 635 of the interconnector housing. Such alignment features can be configured to engage complementary alignment features of the ferrule 180 to main the ferrule in an aligned position within the interior 636 of the interconnector housing 630. In an example, the interconnector housing 600 has substantially the same shape and dimensions of a standard multifiber push-on/pull-off (MPO) connector.

Figure 14A:
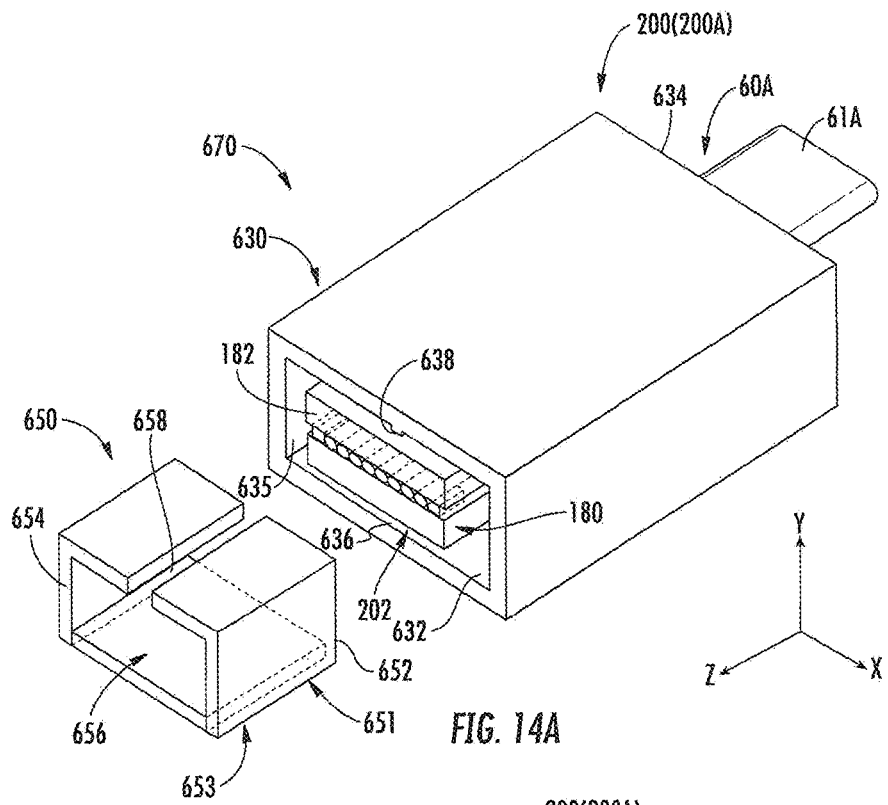
FIGS. 14A and 14B are similar to FIG. 13B and illustrate an example wherein the interconnect device includes an adapter sleeve.
Figure 14B:
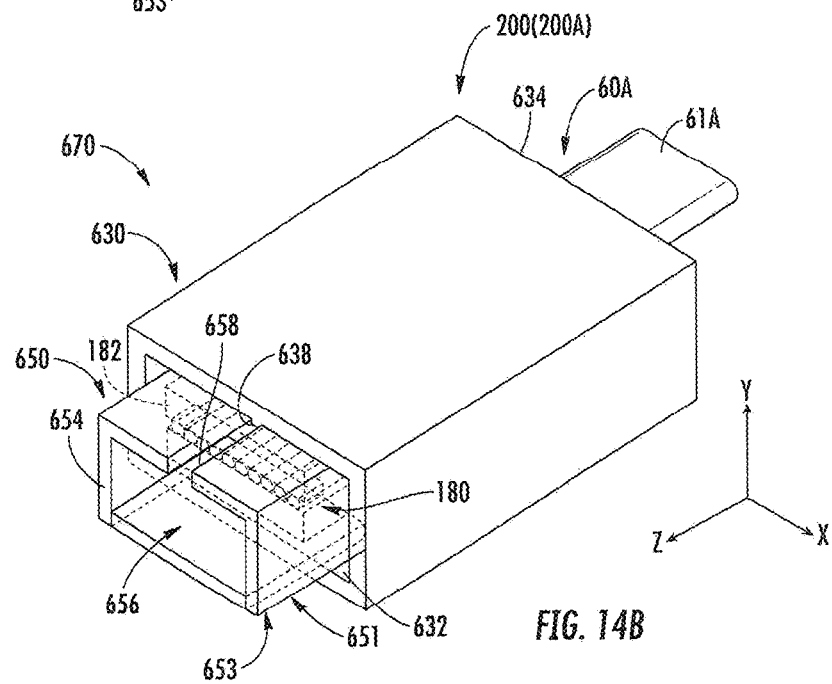

FIG. 14A is similar to FIG. 13B and shows an example where the interconnect device 600 further includes an adapter sleeve 650 that has a front-end section (or first section) 651 with open front end 652, a back-end section (or second section) 653 with an open back end 654, and an interior 656. As shown in FIG. 14B, the front-end section 651 of the adapter sleeve 650 is sized to fit within the open front end 632 of the interconnector housing 630 and over the front-end section 201 of the fiber array assembly 200. In an example, the adapter sleeve 650 can include an alignment feature 658 (e.g., in the form of a slot as shown) that can receive and engage a corresponding alignment feature 638 (e.g., in the form of a detent, as shown) of the interconnector housing 630 when the front-end section 651 of the adapter sleeve 650 is operably arranged within the open front-end 632 of the interconnector housing. The fiber array assembly 200 and the interconnect device a600 define a connectorized fiber array assembly 670.

Figure 15A:
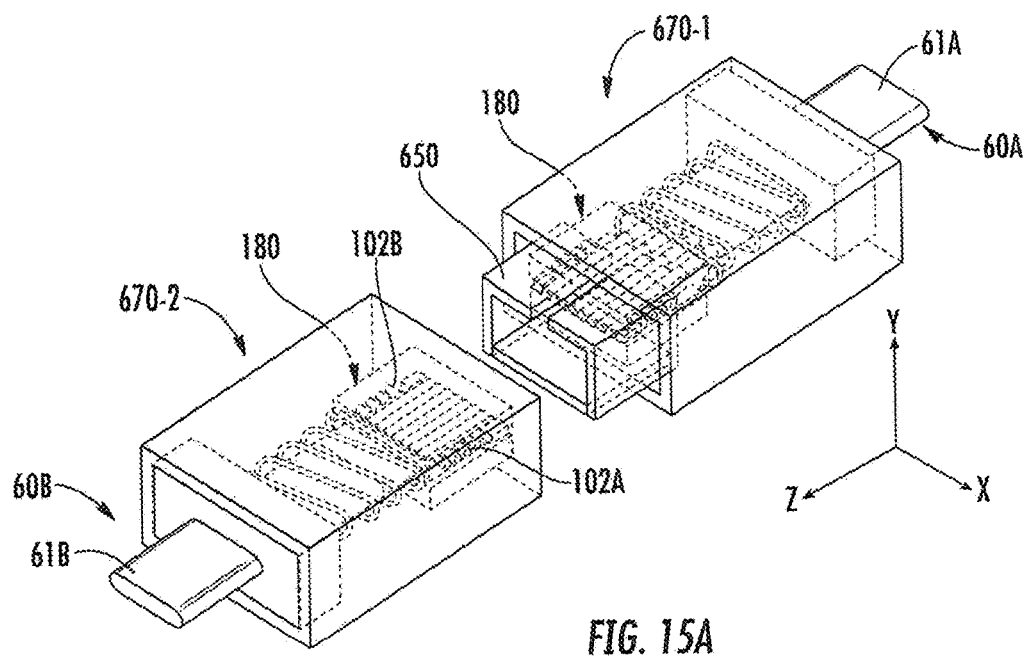
FIGS. 15A and 15B are elevated views similar to FIG. 14B that show how two connectorized fiber array assemblies can be operably engaged using the adapter sleeve.
Figure 15B:
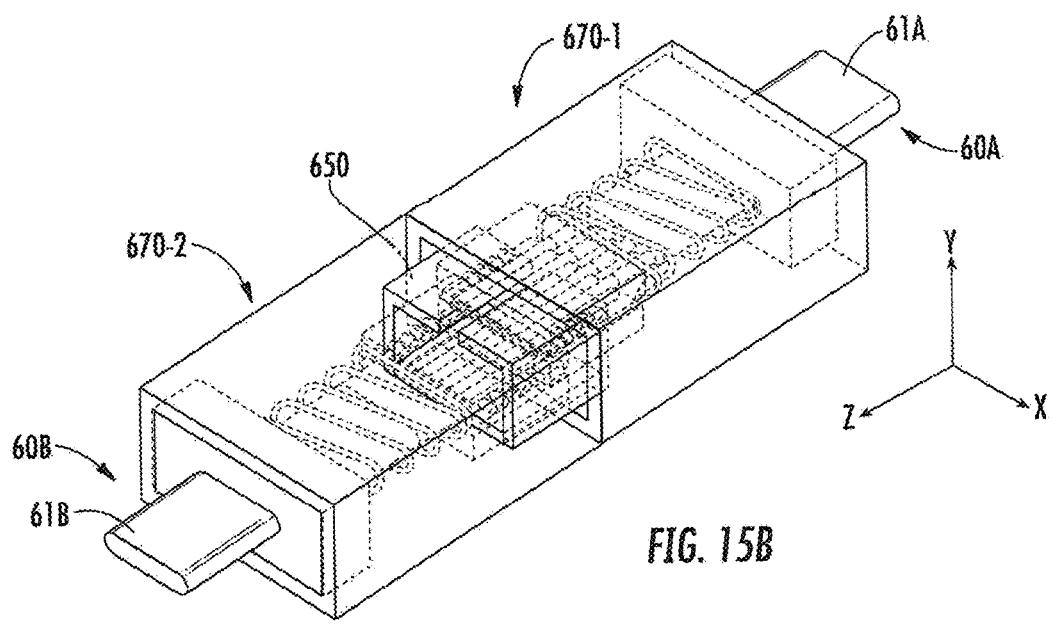

FIGS. 15A and 15B are elevated views similar to FIG. 14B that show first and second connectorized fiber array assemblies 670, namely 670-1 and 670-2, with the first connectorized fiber array assembly 670-1 including the adapter sleeve 650. FIG. 15B shows the two connectorized fiber array assemblies 670 operably engaged, with the front-end section 201 of the fiber array assembly 200 of the second connectorized fiber array assembly 670-2 residing within the back-end section 653 of the adapter sleeve 650.

Contact between the respective front ends 202 of the fiber array assemblies 200 (which in an example extend slightly beyond the open front ends 632 of their respective interconnector housings 630) causes the respective resilient members 620 of the first and second connectorized fiber array assemblies 670-1 and 670-2 to compress and provide an axial force that urges the two fiber array assemblies against each other. Standard connector latching features (not shown) on the respective interconnector housings 630 can be used to attach the first and second connectorized fiber array assemblies 670-1 and 670-2 to each other.

Figure 16A:
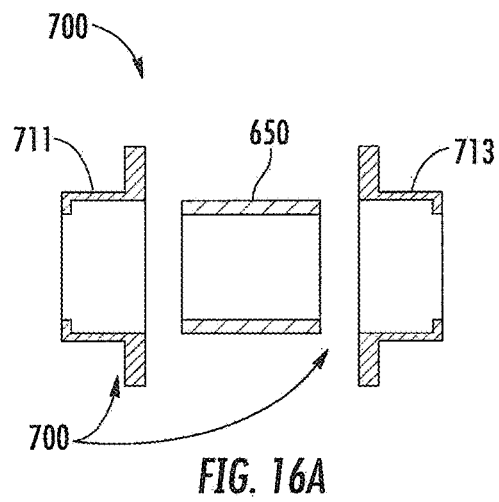
FIG. 16A is an exploded side view and FIG. 16B is a y-z cross-sectional assembled view of an example adapter that can be used to operably connect first and second connectorized fiber array assemblies.
Figure 16B:
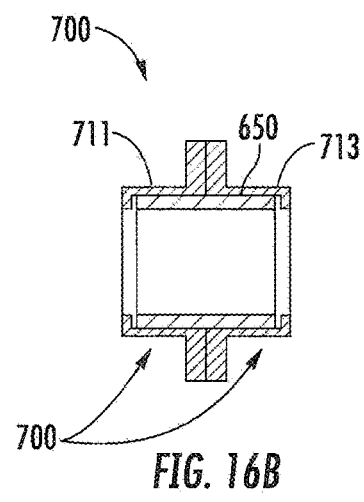

FIG. 16A is an exploded side view and FIG. 16B is a y-z cross-sectional assembled view of an example adapter 700 that can be used to operably connect first and second connectorized fiber array assemblies 670-1 and 670-1. In an example, the adapter 700 includes the adapter sleeve 650 contained within an adapter housing 710 that has first and second sections 711 and 713 that respectively surround the front-end and back-end sections (i.e., first and second sections) 651 and 653 of the adapter sleeve 650.

Figure 16C:
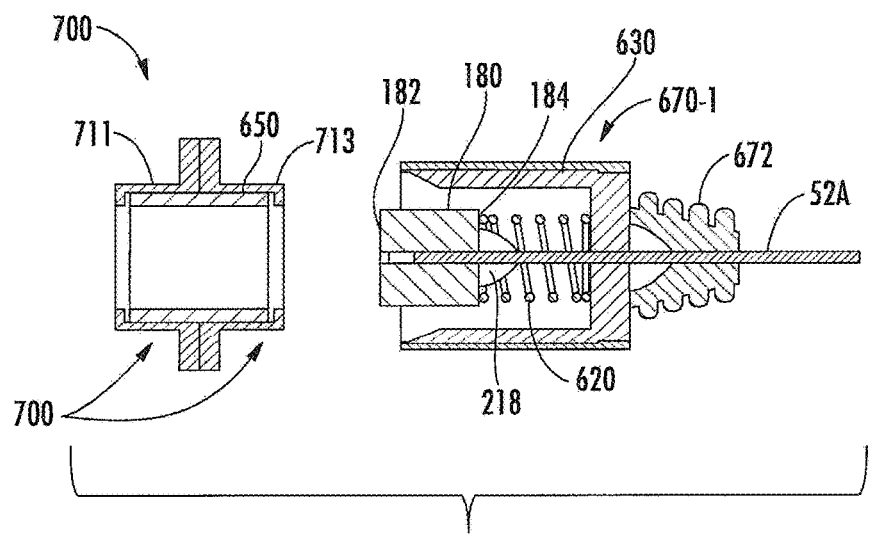
FIG. 16C is a y-z cross-sectional view of the adapter of FIG. 16B along with the first connectorized fiber array assembly.
Figure 16D:
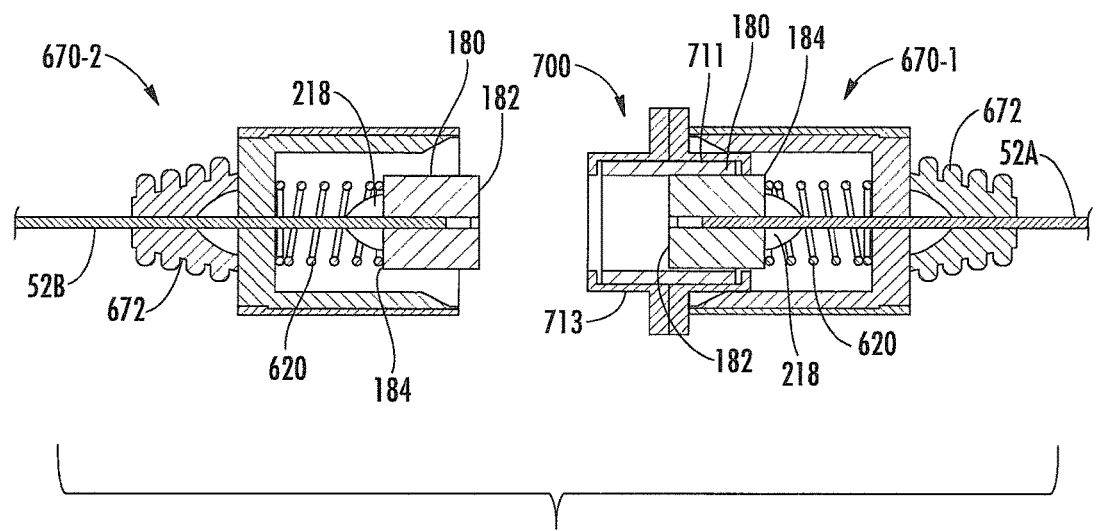
FIG. 16D shows the first connectorized fiber array assembly of FIG. 16B operably engaged with the adapter and also shows a second connectorized fiber array assembly arranged to be received by the adapter.
Figure 16E:
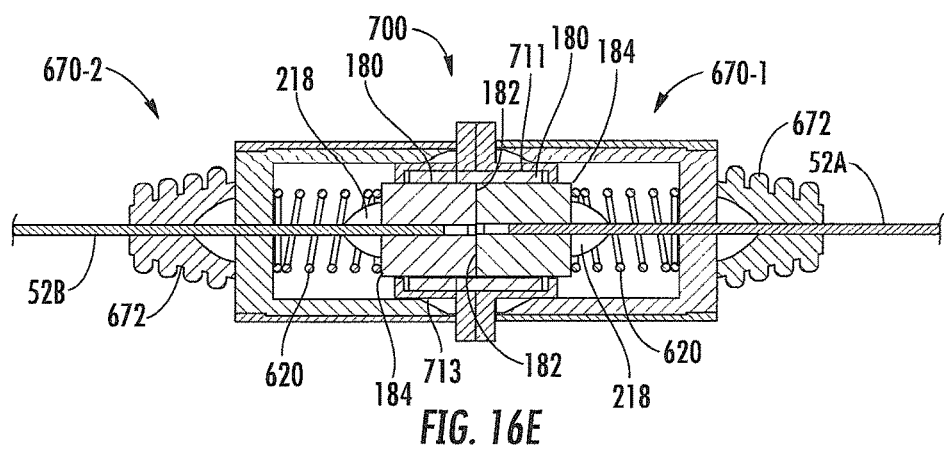
FIG. 16E shows both the first and second connectorized fiber array assemblies of FIG. 16D operably engaged with each other via the adapter.

FIG. 16C is a y-z cross-sectional view of the adapter 700 along with the first connectorized fiber array assembly 670-1, which is shown with a strain-relief features 672. FIG. 16D shows the first connectorized fiber array assembly 670-1 of FIG. 16C operably engaged with the first section 711 of the adapter 700 and also shows the second connectorized fiber array assembly 670-2 identical to the first connectorized fiber array assembly arranged to be received by the second section 713 of the adapter. FIG. 16E shows the first and second connectorized fiber array assemblies 670-1 and 670-2 operably engaged with each other via the adapter 700, with the respective signal fibers 52 of the two connectorized fiber array assemblies in optical communication with each other.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A fiber array assembly, comprising:
  a support substrate having a first surface;
  an interdigitated signal fiber array supported on the first surface of the support substrate, and comprising front-end sections of first signal fibers and interdigitated with either front-end sections of second signal fibers or spacer fibers, wherein the interdigitated signal fiber array has a first side and opposite first and second edges;
  a fiber pusher device comprising glass and comprising first and second ends that are disposed on the first surface of the support substrate so that first and second ends of the fiber pusher device contact and push against the first and second edges of the interdigitated signal-fiber array;
  a cover sheet disposed on the first side of the interdigitated signal-fiber array and covering at least a portion of the fiber pusher device for defining a ferrule having an interior comprising at least the front-end sections of the first signal fibers; and
  a securing material disposed in the interior of the ferrule for securing together the cover sheet, the interdigitated signal-fiber array and the fiber pusher device.

2. The fiber array assembly according to claim 1, wherein the first signal fibers extend from a first multifiber cable.

3. The fiber array assembly according to claim 1, wherein the support substrate comprises glass.

4. The fiber array assembly according to claim 1, wherein the cover sheet comprises glass.

5. The fiber array assembly according to claim 1, wherein the fiber pusher device comprises first and second arrays of pusher fibers.

6. The fiber assembly according to claim 1, wherein the fiber pusher device comprises first and second glass pusher sheets.

7. The fiber array assembly according to claim 6, wherein the interdigitated signal-fiber array has a thickness THI, and wherein the glass pusher sheets each has a thickness THG, and THG≤THI.

8. The fiber assembly according to claim 1, wherein the fiber array assembly has a front-end section and further comprising an interconnect device operably disposed adjacent to the front-end section.

9. The fiber assembly according to claim 8, wherein the interconnect device comprises a housing with an interior, and the ferrule at least partially residing within the interior of the interconnector housing to form a connectorized fiber array assembly.

10. A fiber array assembly product formed by the process comprising:
  interdigitating first signal fibers and second signal fibers to define an interdigitated signal-fiber array supported on a surface of a support substrate, wherein the interdigitated signal-fiber array has opposite first and second sides and opposite first and second opposite edges;
  pushing against the first and second edges of the interdigitated signal-fiber array using a fiber pusher device;
  disposing a cover sheet on the first side of the interdigitated signal-fiber array and covering at least an end portion of the fiber pusher device;
  securing together the interdigitated signal-fiber array, the support substrate, the cover sheet and portions of the fiber pusher device to define a ferrule disposed about the first and second sides and the first and second edges of the interdigitated signal-fiber array; and
  cutting the ferrule through the interdigitated signal-fiber array transverse to the first and second signal fibers to form the at least one fiber array assembly product.

11. The fiber array assembly product according to claim 10, wherein the first signal fibers extend from a first multi-fiber cable and the second signal fibers extend from a second multifiber cable.

12. The fiber array assembly product according to claim 10, wherein the support substrate comprises glass.

13. The fiber array assembly product according to claim 10, wherein the cover sheet comprises glass.

14. The fiber array assembly product of claim 10, wherein the fiber pusher device comprises first and second fiber-pusher arrays of first and second pusher fibers respectively, and wherein the pushing against the first and second edges of the interdigitated signal-fiber array is performed by the first and second fiber-pusher arrays, respectively.

15. The fiber array assembly product of claim 10, wherein the fiber pusher device comprises first and second glass pusher sheets, and wherein the pushing against the first and second edges of the interdigitated signal-fiber array is performed by the first and second glass pusher sheets.

16. The fiber array assembly product according to claim 15, wherein the interdigitated signal-fiber array has a thickness THI measured between the first and second sides, and wherein the glass pusher sheets each has a thickness THG, and THG≤THI.

17. The fiber array assembly product of claim 10, wherein the cutting defines first and second fiber array assemblies, wherein in the first fiber array assembly the second signal fibers define first spacers between the first signal fibers and in the second fiber array assembly the first signal fibers define second spacers between the second signal fibers.

18. The fiber array assembly product of claim 10, wherein the securing includes employing an ultraviolet-curable adhesive and irradiating the ultraviolet-curable adhesive with ultraviolet light through at least one of the support substrate, the cover sheet and the fiber pusher device.

19. The fiber array assembly product of claim 10, further comprising adding an interconnect device to a front-end section of the at least one fiber array assembly to form a connectorized fiber array assembly.

20. The fiber array assembly product according to claim 19, wherein the interconnect device comprises a connector assembly.

21. A method of forming at least one fiber array assembly, comprising:
  interdigitating first signal fibers and second signal fibers to define an interdigitated signal-fiber array supported on a surface of a support substrate, wherein the interdigitated signal-fiber array has opposite first and second sides and opposite first and second opposite edges;
  pushing against the first and second edges of the interdigitated signal-fiber array using a fiber pusher device;
  disposing a cover sheet on the first side of the interdigitated signal-fiber array and covering at least an end portion of the fiber pusher device;
  securing together the interdigitated signal-fiber array, the support substrate, the cover sheet and portions of the fiber pusher device to define a ferrule disposed about the first and second sides and the first and second edges of the interdigitated signal-fiber array; and
  cutting the ferrule through the interdigitated signal-fiber array transverse to the first and second signal fibers to form the at least one fiber array assembly product.

22. The method according to claim 21, wherein the first signal fibers extend from a first multifiber cable and the second signal fibers extend from a second multifiber cable.

23. The method according to claim 21, wherein the support substrate comprises glass.

24. The method according to claim 21, wherein the cover sheet comprises glass.

25. The method according to claim 21, wherein the fiber pusher device comprises first and second fiber-pusher arrays of first and second pusher fibers respectively, and wherein the pushing against the first and second edges of the interdigitated signal-fiber array is performed by the first and second fiber-pusher arrays, respectively.

26. The method according to claim 21, wherein the fiber pusher device comprises first and second glass pusher sheets, and wherein the pushing against the first and second edges of the interdigitated signal-fiber array is performed by the first and second glass pusher sheets.

27. The method according to claim 26, wherein the interdigitated signal-fiber array has a thickness THI measured between the first and second sides, and wherein the glass pusher sheets each has a thickness THG, and THG≤THI.

28. The method according to claim 21, wherein the cutting defines first and second fiber array assemblies, wherein in the first fiber array assembly the second signal fibers define first spacers between the first signal fibers and in the second fiber array assembly the first signal fibers define second spacers between the second signal fibers.

29. The method according to claim 21, wherein the securing includes employing an ultraviolet-curable adhesive and irradiating the ultraviolet-curable adhesive with ultraviolet light through at least one of the support substrate, the cover sheet and the fiber pusher device.

30. The method according to claim 21, further comprising adding an interconnect device to a front-end section of the at least one fiber array assembly to form a connectorized fiber array assembly.

31. The method according to claim 30, wherein the interconnect device comprises a connector assembly.

32. The method according to claim 21, further comprising optically coupling at least one of the first signal fibers and the second signal fibers to respective waveguides of a planar lightwave circuit.

33. The method according to claim 21, wherein the support substrate has first and second opposite ends, wherein the first and second signal fibers are respectively supported in first and second multifiber cables, and wherein either the first and second multifiber cables are each disposed adjacent the first end of the support substrate, or the first and second multifiber cables are respectively disposed adjacent the first and second ends of the support substrate.

* * * * *